US012640976B2

(12) United States Patent
Xiao et al.

(10) Patent No.: US 12,640,976 B2
(45) Date of Patent: May 26, 2026

(54) SCRAMBLING FOR PROBABILISTIC CONSTELLATION SCHEMES IN WIRELESS COMMUNICATIONS

(71) Applicant: QUALCOMM INCORPORATED, San Diego, CA (US)

(72) Inventors: Kexin Xiao, Shanghai (CN); Liangming Wu, Beijing (CN); Changlong Xu, Beijing (CN); Wei Liu, Beijing (CN); Jian Li, Shanghai (CN); Kangqi Liu, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 18/694,309

(22) PCT Filed: Dec. 1, 2021

(86) PCT No.: PCT/CN2021/134807
§ 371 (c)(1),
(2) Date: Mar. 21, 2024

(87) PCT Pub. No.: WO2023/097562
PCT Pub. Date: Jun. 8, 2023

(65) Prior Publication Data
US 2024/0406052 A1    Dec. 5, 2024

(51) Int. Cl.
*H04L 27/34* (2006.01)
*H04L 27/36* (2006.01)
*H04L 27/38* (2006.01)
(52) U.S. Cl.
CPC ........ *H04L 27/3483* (2013.01); *H04L 27/366* (2013.01); *H04L 27/3818* (2013.01)

(58) Field of Classification Search
CPC ............... H04L 27/3483; H04L 27/366; H04L 27/3818; H04L 1/0042; H04L 27/02;
(Continued)

(56) References Cited

U.S. PATENT DOCUMENTS 10,742,472 B1    8/2020   Van Nee
2021/0091886 A1    3/2021   Yoffe et al.
(Continued)

FOREIGN PATENT DOCUMENTS

CN          111669343 A      9/2020
WO    WO-2018121887 A1 *   7/2018   .......... H04L 27/3411
WO    WO-2021045854 A1     3/2021

OTHER PUBLICATIONS

Supplementary Partial European Search Report—EP21965998—Search Authority—Munich—Jul. 18, 2025.
(Continued)

*Primary Examiner* — Sophia Vlahos
(74) *Attorney, Agent, or Firm* — QUALCOMM Incorporated

(57) ABSTRACT

Methods, systems, and devices for scrambling for probabilistic constellation schemes (PCSs) in wireless communications are described. In some examples, a first wireless device may scramble a set of amplitude information bits associated with a transport block for transmission to a second wireless device. In such examples, the first wireless device may perform a distribution matching procedure on the scrambled set of amplitude information bits. The first wireless device may encode the set of distributed amplitude bits and, in some cases, may perform a modulation procedure on the encoded set of distributed amplitude bits in accordance with a PCS scheme to obtain a codeword associated with the transport block. In some examples, the first wireless device may transmit the codeword to the second wireless device.

10 Claims, 17 Drawing Sheets

(58) Field of Classification Search
CPC ........... H04L 25/03828; H04L 27/3405; H04L
1/0041; H04L 1/0045; H04L 1/0047;
H04L 25/03866
See application file for complete search history.

(56)                    References Cited

U.S. PATENT DOCUMENTS

| | | | | |
|---|---|---|---|---|
| 2021/0099249 A1* | 4/2021 | Li | .......................... | H04W 72/04 |
| 2021/0218607 A1* | 7/2021 | Ait Aoudia | ............. | H04L 27/36 |
| 2021/0266204 A1 | 8/2021 | Chen et al. | | |
| 2023/0353282 A1* | 11/2023 | Tao | ....................... | H04L 1/0058 |
| 2024/0007226 A1* | 1/2024 | Wu | ....................... | H04L 1/0042 |

OTHER PUBLICATIONS

Yoshida T., et al., "Compressed Shaping: Concept and FPGA Demonstration", Journal of Lightwave Technology, IEEE, USA, vol. 39, No. 17, Jun. 2, 2021, pp. 5412-5422, XP011877643, pp. 1-10, figure 1.
International Search Report and Written Opinion—PCT/CN2021/134807—ISA/EPO—Aug. 19, 2022.
ZTE: "Discussion on DL 1024QAM for NR FR1", 3GPP TSG RAN WG1 #103-e, R1-2007977, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, pp. 1-16, XP051946553, Nov. 13, 2020, Section 3, Part 3, Section 3, pp. 7 and 8, Figure 5.
Cho J., et al., "Probabilistic Constellation Shaping for Optical Fiber Communications", Journal of Lightwave Technology, IEEE, USA, vol. 37, No. 6, Mar. 15, 2019, pp. 1590-1607, XP011717096, Introduction, figures 2, 3.
Skvortcov P., et al., "Dual Coding Concatenation for Burst-Error Correction in Probabilistic Amplitude Shaping", 2021 European Conference on Optical Communication (ECOC), IEEE, Sep. 13, 2021, 4 Pages, XP034026969, Abstract, Introduction, figure 1.
Supplementary European Search Report EP21965998 Search Authority Munich Oct. 21, 2025.

* cited by examiner

— 200

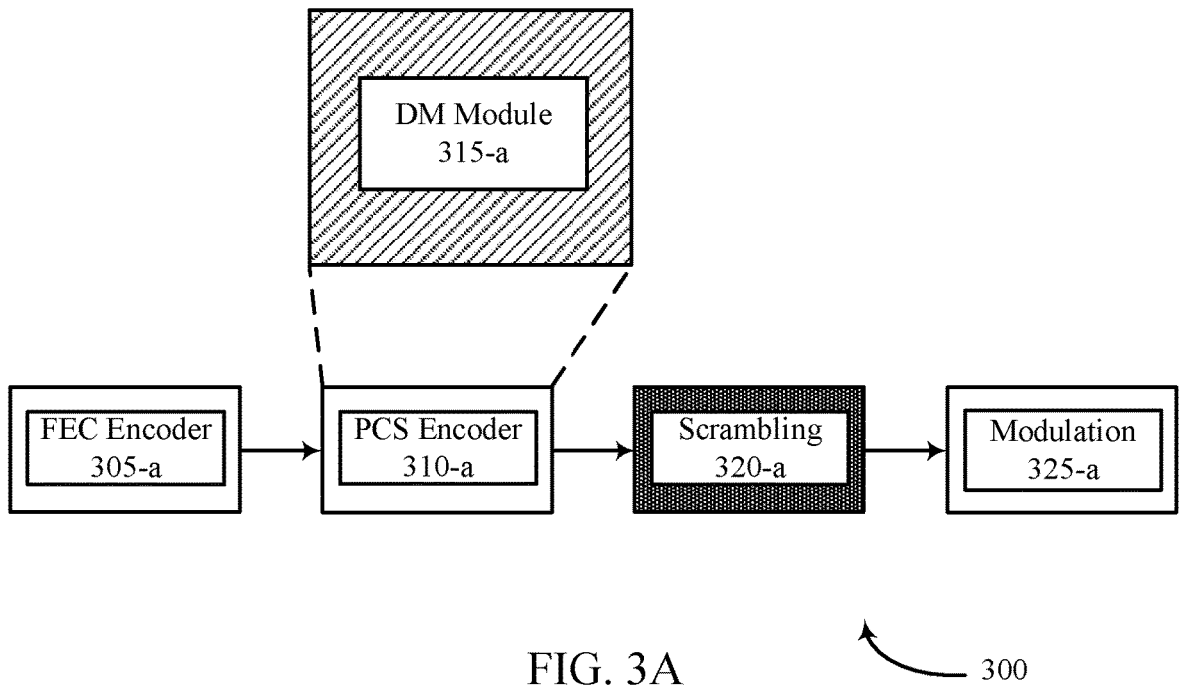
FIG. 3A    300
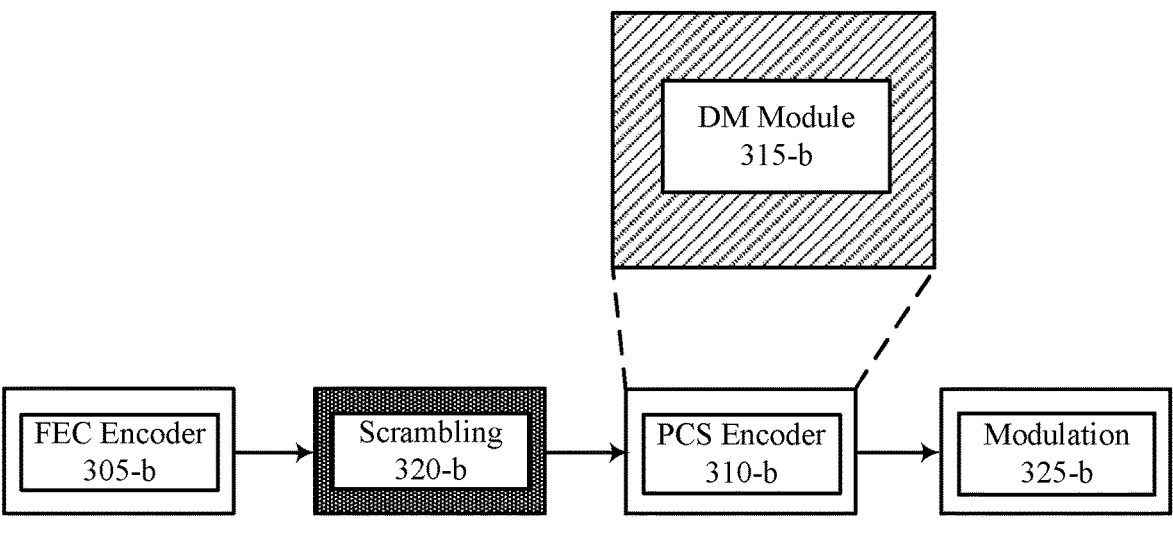
FIG. 3B    301

410    420    415

405

400

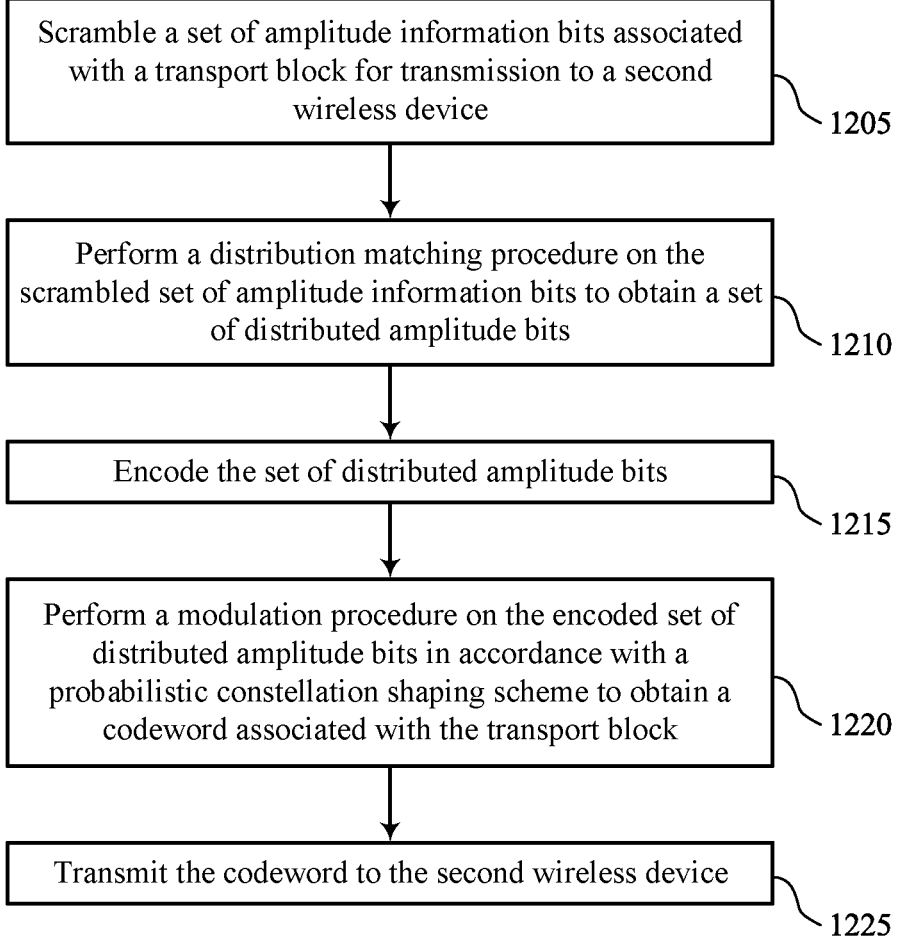

Scramble a set of amplitude information bits associated with a transport block for transmission to a second wireless device

1205

Perform a distribution matching procedure on the scrambled set of amplitude information bits to obtain a set of distributed amplitude bits

1210

Encode the set of distributed amplitude bits

1215

Perform a modulation procedure on the encoded set of distributed amplitude bits in accordance with a probabilistic constellation shaping scheme to obtain a codeword associated with the transport block

1220

Transmit the codeword to the second wireless device

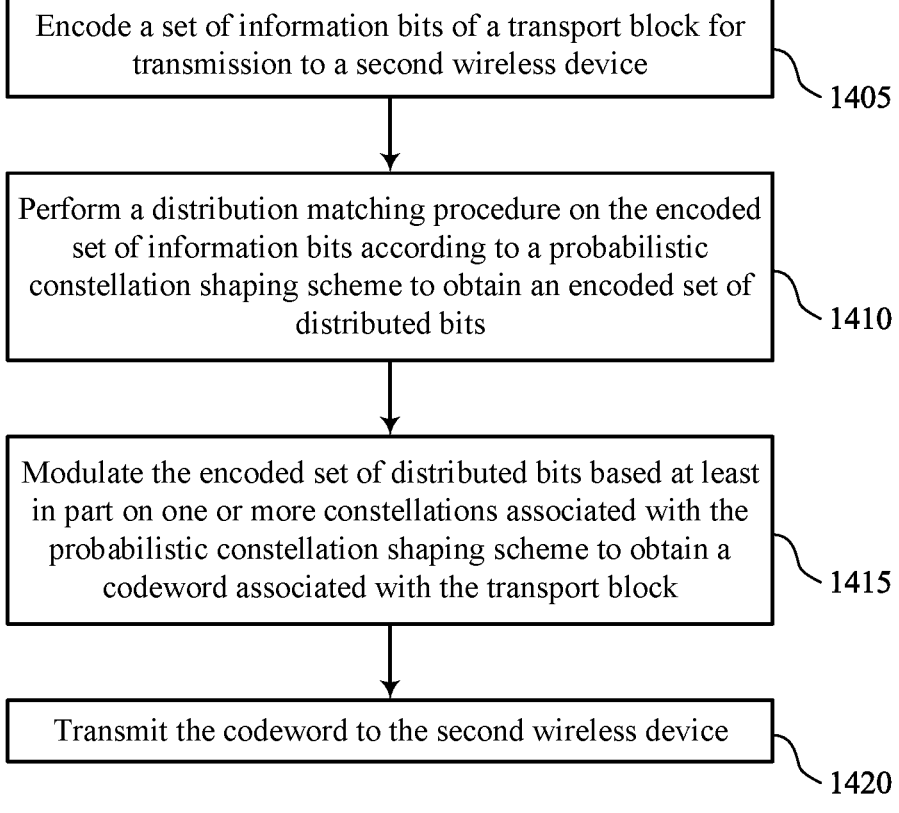

Encode a set of information bits of a transport block for transmission to a second wireless device

1405

Perform a distribution matching procedure on the encoded set of information bits according to a probabilistic constellation shaping scheme to obtain an encoded set of distributed bits

1410

Modulate the encoded set of distributed bits based at least in part on one or more constellations associated with the probabilistic constellation shaping scheme to obtain a codeword associated with the transport block

1415

Transmit the codeword to the second wireless device

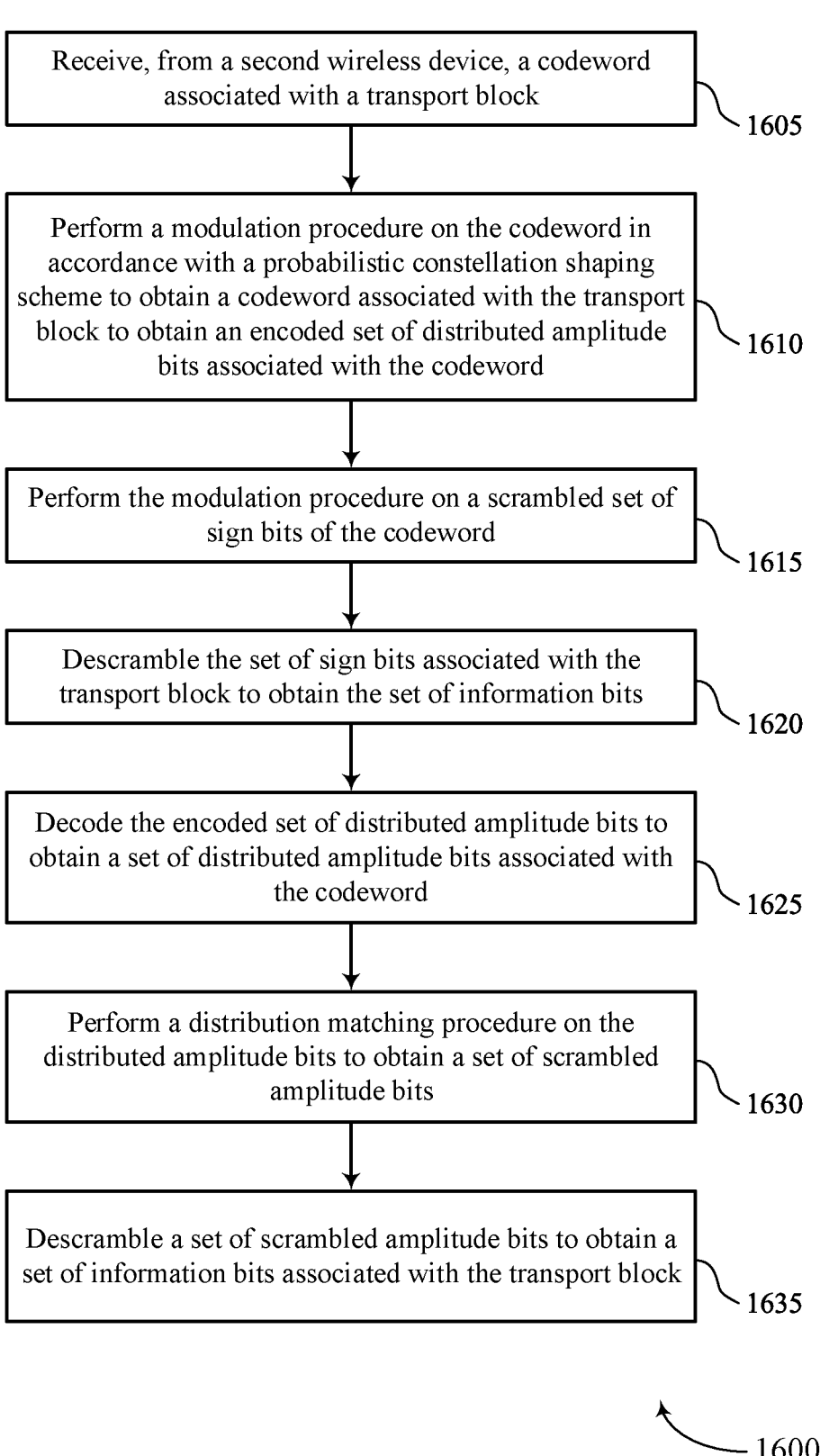

Receive, from a second wireless device, a codeword associated with a transport block — 1605

Perform a modulation procedure on the codeword in accordance with a probabilistic constellation shaping scheme to obtain a codeword associated with the transport block to obtain an encoded set of distributed amplitude bits associated with the codeword — 1610

Perform the modulation procedure on a scrambled set of sign bits of the codeword — 1615

Descramble the set of sign bits associated with the transport block to obtain the set of information bits — 1620

Decode the encoded set of distributed amplitude bits to obtain a set of distributed amplitude bits associated with the codeword — 1625

Perform a distribution matching procedure on the distributed amplitude bits to obtain a set of scrambled amplitude bits — 1630

Descramble a set of scrambled amplitude bits to obtain a set of information bits associated with the transport block — 1635

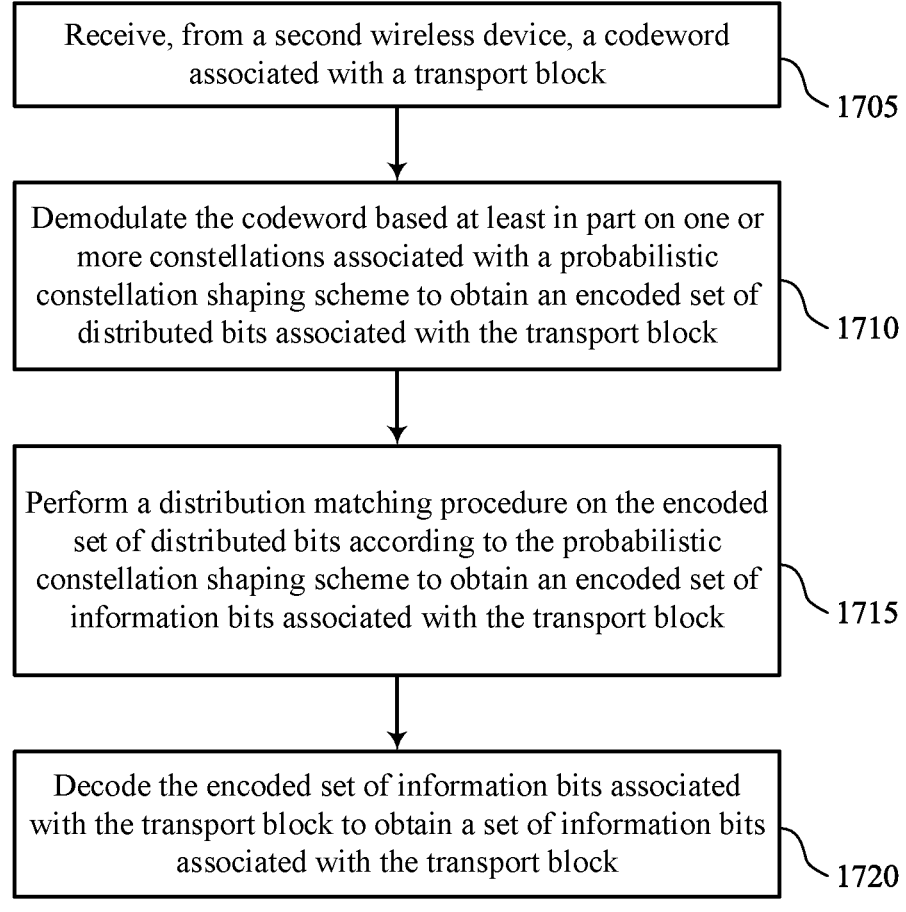

Receive, from a second wireless device, a codeword associated with a transport block

1705

Demodulate the codeword based at least in part on one or more constellations associated with a probabilistic constellation shaping scheme to obtain an encoded set of distributed bits associated with the transport block

1710

Perform a distribution matching procedure on the encoded set of distributed bits according to the probabilistic constellation shaping scheme to obtain an encoded set of information bits associated with the transport block

1715

Decode the encoded set of information bits associated with the transport block to obtain a set of information bits associated with the transport block

SCRAMBLING FOR PROBABILISTIC CONSTELLATION SCHEMES IN WIRELESS COMMUNICATIONS

CROSS REFERENCE

The present Application is a 371 national stage filing of International PCT Application No. PCT/CN2021/134807 by Xiao et al. entitled "SCRAMBLING FOR PROBABILISTIC CONSTELLATION SCHEMES IN WIRELESS COMMUNICATIONS," filed Dec. 1, 2021, which is assigned to the assignee hereof, and which is expressly incorporated by reference in its entirety herein.

FIELD OF TECHNOLOGY

The following relates to wireless communications, including scrambling for probabilistic constellation schemes in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some devices in a wireless network may use constellation shaping as part of a signal modulation process. To approach the Shannon capacity (e.g., a theoretical maximum amount of information or data capacity that can be sent over a channel or medium), the transmission of quadrature amplitude modulation (QAM) may be non-uniformly distributed (e.g., using probabilistic constellation shaping (PCS)).

SUMMARY

The described techniques relate to improved methods, systems, devices, and apparatuses that support scrambling for probabilistic constellation schemes (PCSs) in wireless communications. Generally, the described techniques provide for wireless devices implementing scrambling for amplitude information bits (e.g., before implementing a distribution matching (DM) module), implementing scrambling for sign information bits (e.g., after implementing a forward error correction (FEC) encoder), or both, in cases where a DM module may be implemented before an FEC encoder. In some examples, for a probabilistic constellation shaping (PCS) structure where a shaping encoder, and thus a DM module, is after the FEC encoder, wireless devices may implement scrambling before or after the shaping encoder.

A method for wireless communications at a first wireless device is described. The method may include scrambling a set of amplitude information bits associated with a transport block (TB) for transmission to a second wireless device, performing a DM procedure on the scrambled set of amplitude information bits to obtain a set of distributed amplitude bits, encoding the set of distributed amplitude bits, performing a modulation procedure on the encoded set of distributed amplitude bits in accordance with a PCS scheme to obtain a codeword associated with the TB, and transmitting the codeword to the second wireless device.

An apparatus for wireless communications at a first wireless device is described. The apparatus may include a processor, memory coupled with the processor, and instructions stored in the memory. The instructions may be executable by the processor to cause the apparatus to scramble a set of amplitude information bits associated with a TB for transmission to a second wireless device, perform a DM procedure on the scrambled set of amplitude information bits to obtain a set of distributed amplitude bits, encode the set of distributed amplitude bits, perform a modulation procedure on the encoded set of distributed amplitude bits in accordance with a PCS scheme to obtain a codeword associated with the TB, and transmit the codeword to the second wireless device.

Another apparatus for wireless communications at a first wireless device is described. The apparatus may include means for scrambling a set of amplitude information bits associated with a TB for transmission to a second wireless device, means for performing a DM procedure on the scrambled set of amplitude information bits to obtain a set of distributed amplitude bits, means for encoding the set of distributed amplitude bits, means for performing a modulation procedure on the encoded set of distributed amplitude bits in accordance with a PCS scheme to obtain a codeword associated with the TB, and means for transmitting the codeword to the second wireless device.

A non-transitory computer-readable medium storing code for wireless communications at a first wireless device is described. The code may include instructions executable by a processor to scramble a set of amplitude information bits associated with a TB for transmission to a second wireless device, perform a DM procedure on the scrambled set of amplitude information bits to obtain a set of distributed amplitude bits, encode the set of distributed amplitude bits, perform a modulation procedure on the encoded set of distributed amplitude bits in accordance with a PCS scheme to obtain a codeword associated with the TB, and transmit the codeword to the second wireless device.

Some examples of the method, apparatuses, and non-transitory computer-readable medium described herein may further include operations, features, means, or instructions for scrambling a set of sign bits associated with the TB and performing the modulation procedure on the scrambled set of sign bits, where the codeword includes the scrambled set of sign bits after the modulation procedure.

In some examples of the method, apparatuses, and non-transitory computer-readable medium described herein, scrambling the set of sign bits may include operations, features, means, or instructions for scrambling the set of sign bits based on an index value associated with a number of the set of amplitude information bits.

In some examples of the method, apparatuses, and non-transitory computer-readable medium described herein, scrambling the set of sign bits may include operations, features, means, or instructions for scrambling the set of sign bits based on a default index value associated with the set of sign bits.

In some examples of the method, apparatuses, and non-transitory computer-readable medium described herein, the set of sign bits includes one or more sign bits associated with the TB, one or more cyclic redundancy check (CRC) bits associated with a code block of the TB, one or more parity check bits output after an encoding procedure, or a combination thereof.

In some examples of the method, apparatuses, and non-transitory computer-readable medium described herein, performing the modulation procedure may include operations, features, means, or instructions for mapping the encoded set of distributed amplitude bits to one or more symbol constellations according to the PCS scheme, where the codeword includes one or more modulated symbols based on the mapping.

Some examples of the method, apparatuses, and non-transitory computer-readable medium described herein may further include operations, features, means, or instructions for segmenting the set of distributed amplitude bits into a set of multiple code blocks and encoding the set of multiple code blocks as part of encoding the set of distributed amplitude bits.

A method for wireless communications at a first wireless device is described. The method may include encoding a set of information bits of a TB for transmission to a second wireless device, performing a DM procedure on the encoded set of information bits according to a PCS scheme to obtain an encoded set of distributed bits, modulating the encoded set of distributed bits based on one or more constellations associated with the PCS scheme to obtain a codeword associated with the TB, and transmitting the codeword to the second wireless device.

An apparatus for wireless communications at a first wireless device is described. The apparatus may include a processor, memory coupled with the processor, and instructions stored in the memory. The instructions may be executable by the processor to cause the apparatus to encode a set of information bits of a TB for transmission to a second wireless device, perform a DM procedure on the encoded set of information bits according to a PCS scheme to obtain an encoded set of distributed bits, modulate the encoded set of distributed bits based on one or more constellations associated with the PCS scheme to obtain a codeword associated with the TB, and transmit the codeword to the second wireless device.

Another apparatus for wireless communications at a first wireless device is described. The apparatus may include means for encoding a set of information bits of a TB for transmission to a second wireless device, means for performing a DM procedure on the encoded set of information bits according to a PCS scheme to obtain an encoded set of distributed bits, means for modulating the encoded set of distributed bits based on one or more constellations associated with the PCS scheme to obtain a codeword associated with the TB, and means for transmitting the codeword to the second wireless device.

A non-transitory computer-readable medium storing code for wireless communications at a first wireless device is described. The code may include instructions executable by a processor to encode a set of information bits of a TB for transmission to a second wireless device, perform a DM procedure on the encoded set of information bits according to a PCS scheme to obtain an encoded set of distributed bits, modulate the encoded set of distributed bits based on one or more constellations associated with the PCS scheme to obtain a codeword associated with the TB, and transmit the codeword to the second wireless device.

Some examples of the method, apparatuses, and non-transitory computer-readable medium described herein may further include operations, features, means, or instructions for scrambling the encoded set of distributed bits after the DM procedure, where the modulating the encoded set of distributed bits includes modulating the scrambled encoded set of distributed bits.

Some examples of the method, apparatuses, and non-transitory computer-readable medium described herein may further include operations, features, means, or instructions for scrambling the encoded set of distributed bits before the DM procedure, where the DM procedure may be performed on the scrambled encoded set of distributed bits.

A method for wireless communications at a first device is described. The method may include receiving, from a second wireless device, a codeword associated with a TB, performing a modulation procedure on the codeword in accordance with a PCS scheme to obtain a codeword associated with the TB to obtain an encoded set of distributed amplitude bits associated with the codeword, decoding the encoded set of distributed amplitude bits to obtain a set of distributed amplitude bits associated with the codeword, performing a DM procedure on the distributed amplitude bits to obtain a set of scrambled amplitude bits, and descrambling a set of scrambled amplitude bits to obtain a set of information bits associated with the TB.

An apparatus for wireless communications at a first device is described. The apparatus may include a processor, memory coupled with the processor, and instructions stored in the memory. The instructions may be executable by the processor to cause the apparatus to receive, from a second wireless device, a codeword associated with a TB, perform a modulation procedure on the codeword in accordance with a PCS scheme to obtain a codeword associated with the TB to obtain an encoded set of distributed amplitude bits associated with the codeword, decode the encoded set of distributed amplitude bits to obtain a set of distributed amplitude bits associated with the codeword, perform a DM procedure on the distributed amplitude bits to obtain a set of scrambled amplitude bits, and descramble a set of scrambled amplitude bits to obtain a set of information bits associated with the TB.

Another apparatus for wireless communications at a first device is described. The apparatus may include means for receiving, from a second wireless device, a codeword associated with a TB, means for performing a modulation procedure on the codeword in accordance with a PCS scheme to obtain a codeword associated with the TB to obtain an encoded set of distributed amplitude bits associated with the codeword, means for decoding the encoded set of distributed amplitude bits to obtain a set of distributed amplitude bits associated with the codeword, means for performing a DM procedure on the distributed amplitude bits to obtain a set of scrambled amplitude bits, and means for descrambling a set of scrambled amplitude bits to obtain a set of information bits associated with the TB.

A non-transitory computer-readable medium storing code for wireless communications at a first device is described. The code may include instructions executable by a processor to receive, from a second wireless device, a codeword associated with a TB, perform a modulation procedure on the codeword in accordance with a PCS scheme to obtain a codeword associated with the TB to obtain an encoded set of distributed amplitude bits associated with the codeword, decode the encoded set of distributed amplitude bits to obtain a set of distributed amplitude bits associated with the codeword, perform a DM procedure on the distributed amplitude bits to obtain a set of scrambled amplitude bits, and descramble a set of scrambled amplitude bits to obtain a set of information bits associated with the TB.

Some examples of the method, apparatuses, and non-transitory computer-readable medium described herein may further include operations, features, means, or instructions for performing the modulation procedure on a scrambled set of sign bits of the codeword and descrambling the set of sign bits associated with the TB to obtain the set of information bits.

In some examples of the method, apparatuses, and non-transitory computer-readable medium described herein, descrambling the set of sign bits may include operations, features, means, or instructions for descrambling the set of sign bits based on an index value associated with a number of the set of amplitude information bits.

In some examples of the method, apparatuses, and non-transitory computer-readable medium described herein, descrambling the set of sign bits may include operations, features, means, or instructions for descrambling the set of sign bits based on a default index value associated with the set of sign bits.

In some examples of the method, apparatuses, and non-transitory computer-readable medium described herein, the set of sign bits includes one or more sign bits associated with the TB, one or more CRC bits associated with a code block of the TB, one or more parity check bits output after an encoding procedure, or a combination thereof.

A method for wireless communications at a first wireless device is described. The method may include receiving, from a second wireless device, a codeword associated with a TB, demodulating the codeword based on one or more constellations associated with a PCS scheme to obtain an encoded set of distributed bits associated with the TB, performing a DM procedure on the encoded set of distributed bits according to the PCS scheme to obtain an encoded set of information bits associated with the TB, and decoding the encoded set of information bits associated with the TB to obtain a set of information bits associated with the TB.

An apparatus for wireless communications at a first wireless device is described. The apparatus may include a processor, memory coupled with the processor, and instructions stored in the memory. The instructions may be executable by the processor to cause the apparatus to receive, from a second wireless device, a codeword associated with a TB, demodulate the codeword based on one or more constellations associated with a PCS scheme to obtain an encoded set of distributed bits associated with the TB, perform a DM procedure on the encoded set of distributed bits according to the PCS scheme to obtain an encoded set of information bits associated with the TB, and decode the encoded set of information bits associated with the TB to obtain a set of information bits associated with the TB.

Another apparatus for wireless communications at a first wireless device is described. The apparatus may include means for receiving, from a second wireless device, a codeword associated with a TB, means for demodulating the codeword based on one or more constellations associated with a PCS scheme to obtain an encoded set of distributed bits associated with the TB, means for performing a DM procedure on the encoded set of distributed bits according to the PCS scheme to obtain an encoded set of information bits associated with the TB, and means for decoding the encoded set of information bits associated with the TB to obtain a set of information bits associated with the TB.

A non-transitory computer-readable medium storing code for wireless communications at a first wireless device is described. The code may include instructions executable by a processor to receive, from a second wireless device, a codeword associated with a TB, demodulate the codeword based on one or more constellations associated with a PCS scheme to obtain an encoded set of distributed bits associated with the TB, perform a DM procedure on the encoded set of distributed bits according to the PCS scheme to obtain an encoded set of information bits associated with the TB, and decode the encoded set of information bits associated with the TB to obtain a set of information bits associated with the TB.

Some examples of the method, apparatuses, and non-transitory computer-readable medium described herein may further include operations, features, means, or instructions for descrambling the encoded set of distributed bits before the DM procedure.

Some examples of the method, apparatuses, and non-transitory computer-readable medium described herein may further include operations, features, means, or instructions for descrambling the encoded set of information bits after the DM procedure.

BRIEF DESCRIPTION OF THE DRAWINGS

FIGS. 2, 3A, and 3B illustrate examples of data processing schemes that support scrambling for probabilistic constellation schemes in wireless communications in accordance with aspects of the present disclosure.

FIGS. 12 through 17 show flowcharts illustrating methods that support scrambling for probabilistic constellation schemes in wireless communications in accordance with aspects of the present disclosure.

DETAILED DESCRIPTION

Some devices in a wireless network may use constellation shaping as part of a signal modulation process. To approach the Shannon capacity (e.g., a theoretical maximum amount of information or data capacity that can be sent over a channel or medium), the transmission of quadrature amplitude modulation (QAM) may be non-uniformly distributed (e.g., using probabilistic constellation shaping (PCS)). In some cases, coded bits output from a forward error correction (FEC) encoder may be scrambled with a pseudo-random sequence and mapped to respective constellations at a transmitter. Such scrambling before constellation mapping may be used to randomize transmit symbols and to further suppress interference in wireless communications. In some cases, wireless devices using PCS may introduce a distribution matching (DM) module between source information and the FEC encoder. However, in order to maintain a target constellation probability distribution, wireless devices may refrain from randomizing the systematic bits output from the DM module. As such, in some cases, wireless devices may lack support to directly perform scrambling after the FEC encoder. The techniques described herein may provide for implementing scrambling for PCS systems such that the target symbol distribution may not be destroyed and interference may be suppressed by randomizing transmit symbols.

In some examples, wireless devices may support different options for PCS scrambling. For example, a wireless device may implement scrambling for amplitude information bits (e.g., before implementing a DM module), implement scrambling for sign information bits (e.g., after implementing an FEC encoder), or both, mainly for PCS structures that perform DM before the FEC encoder. In some examples, for a PCS structure where a shaping encoder, and thus a DM module, is after the FEC encoder, wireless devices may implement scrambling before or after the shaping encoder.

Configuring devices to scramble information bits in accordance with such data processing schemes may support scrambling for PCS systems to maintain a target symbol distribution while suppressing channel interference by retaining a transmit symbol randomization.

Aspects of the disclosure are initially described in the context of wireless communications systems. Aspects of the disclosure are then illustrated in the context of data processing schemes. Aspects of the disclosure are further illustrated by and described with reference to apparatus diagrams, system diagrams, and flowcharts that relate to scrambling for probabilistic constellation schemes in wireless communications.

Figure 1:
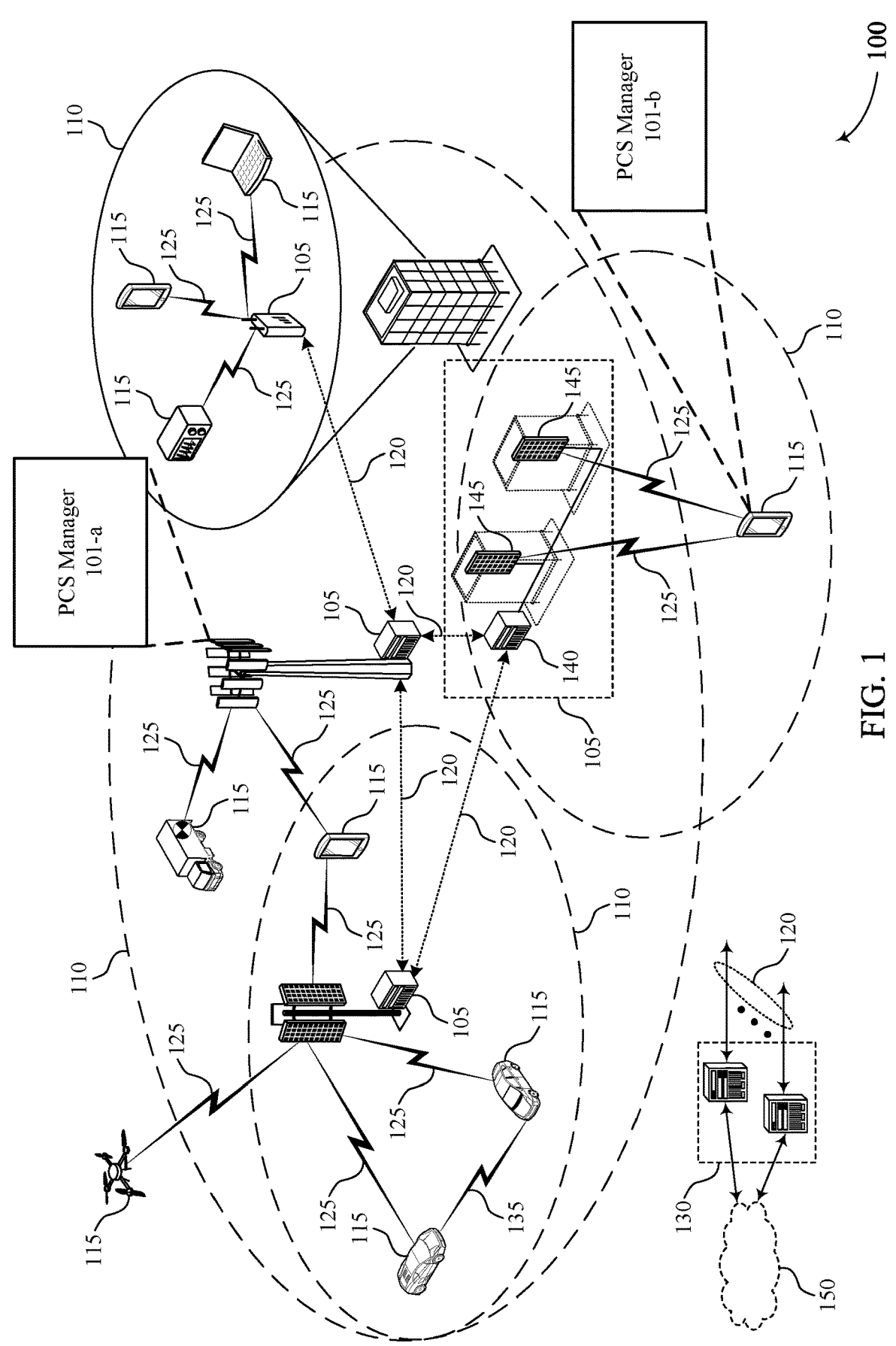
FIG. 1 illustrates an example of a wireless communications system that supports scrambling for probabilistic constellation schemes in wireless communications in accordance with aspects of the present disclosure.

FIG. 1 illustrates an example of a wireless communications system 100 that supports scrambling for probabilistic constellation schemes in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta$f) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, wireless devices may support different options for PCS scrambling. To support such PCS scrambling, wireless devices may use a PCS manager 101 which may be configured to perform the techniques as described herein. For example, a base station 105 may include a PCS manager 101-*a* and a UE 115 may include a PCS manager 101-*b* which may implement scrambling for amplitude information bits (e.g., before implementing a DM module), implement scrambling for sign information bits (e.g., after implementing an FEC encoder), or both, mainly for PCS structures that perform DM before an FEC encoder.

Figure 2:
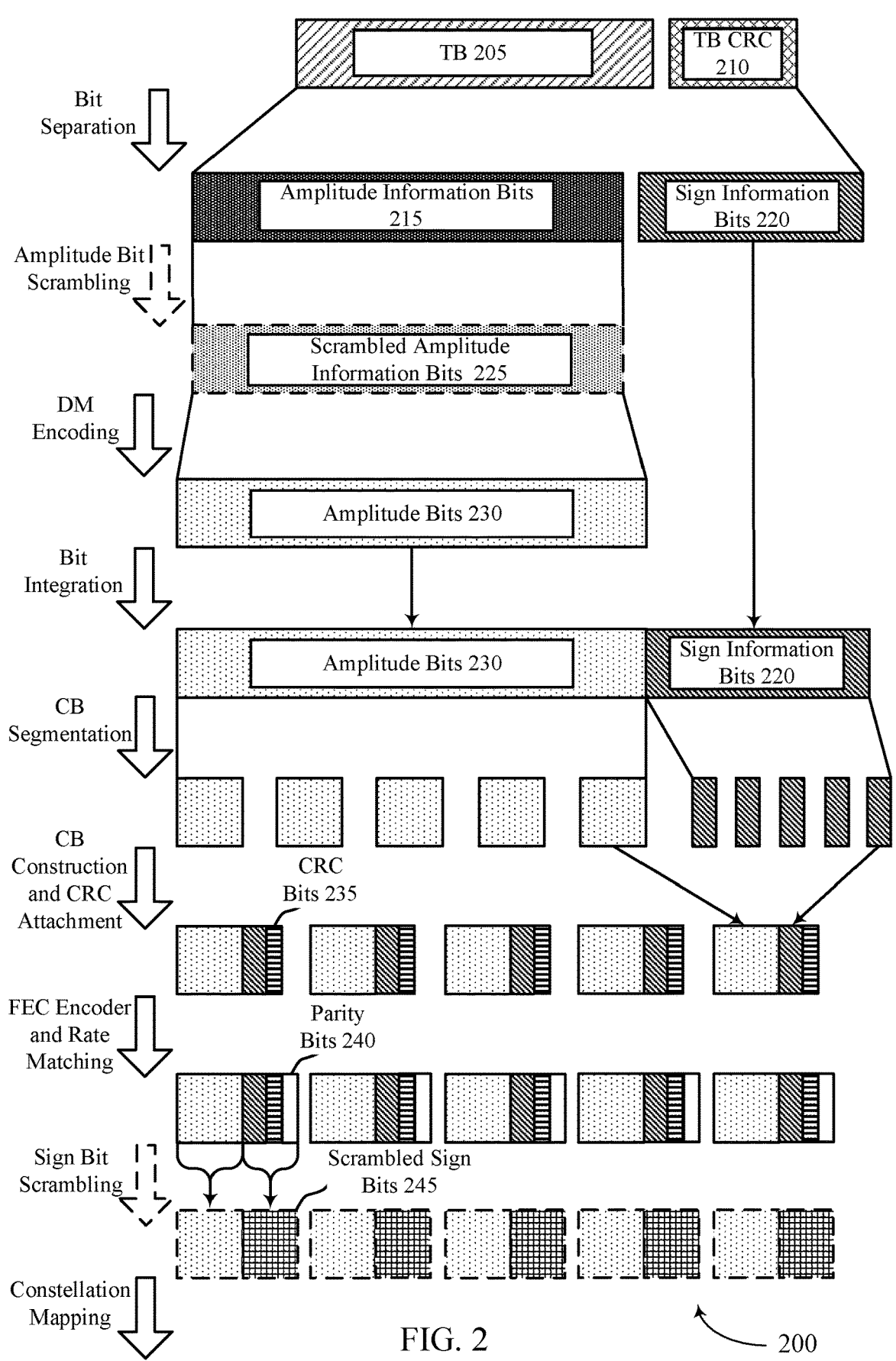

FIG. 2 illustrates an example of a data processing scheme 200 that supports scrambling for probabilistic constellation schemes in wireless communications in accordance with aspects of the present disclosure. The data processing scheme 200 may implement or be implemented by aspects of the wireless communications system 100. For example, the PCS Manager 101-*a*, the PCS Manager 101-*b*, or both, may use data processing scheme 200 when preparing signals to be transmitted. In some examples, wireless devices may be configured to scramble information bits before a DM module, after an FEC encoder, or both. For example, wireless devices may scramble amplitude information bits before a DM module, sign information bits after an FEC encoder, or both.

Some devices in a wireless network may use constellation shaping as part of a signal modulation process. To approach the Shannon capacity (e.g., a theoretical maximum amount of information or data capacity that can be sent over a channel or medium), the transmission of quadrature amplitude modulation (QAM) may be non-uniformly distributed. For instance, uniform QAM may be a number of dB away from a capacity line asymptotically, which a non-uniformly distributed QAM may be closer in dB to the capacity line. In some examples, Gaussian distribution of constellation symbols may be achieved using two methods. In a first example, a geometric constellation shaping may be achieved using equal probability constellation with Gaussian amplitude distribution. In a second example, a PCS may be achieved using uniform QAM with non-equal probability of constellation.

In the case of data processing scheme 200, wireless devices may be configured to implement a DM module before an FEC encoder. A DM module may include software, hardware, or any combination of components operable to apply one or more parameters to a sequence of bits to achieve an output sequence of bits for purposes of constellation shaping as described herein. For example, an overall DM module with fixed-to-fixed (f2f) length may input a uniformly distributed bit sequence with length "k" and may output a symbol sequence with length "n" and with a non-uniform probability distribution with path management function (PMF) "P." In some cases, the DM module may use CCDM, MPDM, sphere shaping, PCDM, among other shaping schemes. Additionally, wireless devices may have an encoder configured to perform error correction coding for the set of bits to be coded. For example, the encoder may be an example of an FEC encoder, where the encoder may code the set of bits to be coded using systematic Polar codes, low density parity check (LDPC) codes, among other examples of coding techniques. In some cases, the FEC encoder may code the set of bits in accordance with a rate. For example, the FEC encoder may code the set of bits in accordance with $\text{Rate}_{FEC}=(m-1+\gamma)/m$, where m may indicate a modulation order (i.e., for 8-ASK, m=3), and $\gamma$ may be determined by the $\text{Rate}_{FEC}$.

In some cases, coded bits may be scrambled with a pseudo-random sequence (e.g., a 31 length Gold sequence) and mapped to respective constellations at a transmitter. Such scrambling before constellation mapping may be used to randomize transmit symbols and to further suppress interference in wireless communications. In some cases, wireless devices using PCS may experience a higher rate (e.g., data rate) and a higher spectrum efficiency as compared to using uniform constellations (e.g., using GCS). Further, PCS may be widely used in optical communications. In some cases, wireless devices using PCS may introduce a DM module between source information and the FEC encoder. However, in order to maintain a target constellation probability distribution, wireless devices may refrain from randomizing the systematic bits output from the distribution matcher. As such, in some cases, wireless devices may lack support to directly perform scrambling after a channel encoder (e.g., the FEC encoder). The techniques described herein may provide for implementing scrambling for PCS systems such that the target symbol distribution may not be destroyed and interference may be suppressed by randomizing transmit symbols.

In some examples, the data processing scheme 200 may support different options for PCS scrambling. For example, using data processing scheme 200, a wireless device may implement scrambling for amplitude information bits (e.g., before implementing a DM module), implement scrambling for sign information bits (e.g., after implementing an FEC encoder), or both, mainly for PCS structures that perform DM before the FEC encoder.

In some examples, the data processing scheme 200 may include a bit separation step, where a transport block (TB) 205 and a TB CRC 210 may be separated into amplitude information bits 215 and sign information bits 220.

In some examples, the data processing scheme 200 may support an amplitude bit scrambling, where the amplitude information bits 215 may be scrambled before implementing the DM module. That is, a first wireless device using data processing scheme 200 may scramble a set of amplitude information bits 215 associated with a TB 205 for transmission to a second wireless device. For example, the amplitude information bits 215 may be represented by the sequence b(0), b(1), . . . , b($N_{amp}$−1), where $N_{amp}$ may be a number of amplitude information bits 215 before implementing the DM module. In such examples, the amplitude bit scrambling may be performed on the amplitude information bits 215 in accordance with a specific scrambling rule. For example, the scrambled amplitude information bits 225 may be produced using Equation 1.

$$\hat{b}(i) = (b(i) + c(i)) \bmod 2, i = 0, \dots, N_{amp} - 1 \qquad (1)$$

In Equation 1, $N_{amp}$ may be a number of amplitude information bits 215, $\hat{b}(i)$ may be an ith scrambled amplitude bit, b(i) may be an ith amplitude bit, and c(i) may be a scrambling sequence known to wireless devices. In some examples, c(i) may be a pseudo-random sequence such as a length-31 Gold sequence. For example, c(i) may be defined by c(n)=($x_1$(n+$N_c$)+$x_2$(n+$N_c$))mod 2, where $x_1$ may be a first sequence and may be initialized by $x_1$(0)=1, $x_1$(n)=0, n=1, 2, . . . , 30, where n may be an index spanning from 0 to 30 in accordance with the Gold sequence being of length 31. Further, $x_2$ may be a second sequence, where the second sequence may have an initialization defined by $$c_{init} = \sum_{i=0}^{30} x_2(i) 2^i,$$

where the value of $x_2$(i) may depend on an application of the sequence. Additionally, $N_c$ may be equal to a specific value, such as an integer value of 1600, for example.

In some examples, the data processing scheme 200 may support a DM encoding step (e.g., performed by a DM module). That is, the first wireless device may perform a distribution matching procedure on the scrambled set of amplitude information bits 215 to obtain a set of distributed amplitude bits. For example, the DM module may take amplitude information bits 215 (e.g., in the case of no amplitude bit scrambling) or scrambled amplitude information bits 225 (e.g., in the case of amplitude bit scrambling) and may output amplitude bits 230. The DM module may produce the amplitude bits 230 using CCDM, MPDM, sphere shaping, PCDM, among other shaping schemes.

In some examples, after the DM encoding step, the data processing scheme 200 may support a bit integration step, where wireless devices may be configured to concatenate, or otherwise integrate, the amplitude bits 230 (e.g., distributed amplitude bits output from the DM module) and the sign information bits. Additionally, in some cases, the data processing scheme may support code block (CB) segmentation, where the amplitude bits 230 and the sign bits 220 may be segmented into separate CBs. In the example of data processing scheme 200, both the amplitude bits 230 and the sign bis 220 may be segmented into five separate CBs. In some examples, the data processing scheme 200 may support CB construction and CRC attachment, where each CB from the amplitude bits 230 may be concatenated with, or otherwise integrated with, a respective CB from the sign information bits 220. In the example of the data processing scheme 200, the fifth CB from the amplitude bits 230 may be concatenated with the fifth CB from the sign information bits 220. Further, CRC bits 235 may be attached to each concatenated CB (e.g., the combination of an amplitude bit 230 CB and a sign information bit 220 CB).

In some examples, the data processing scheme 200 may support the use of an FEC encoder and may perform rate matching. That is, the first wireless device may encode the set of distributed amplitude bits (e.g., the plurality of CBs) output from the distribution matcher. For example, the FEC encoder may input the concatenated CB and the CRC bits 235 and may output parity bits 240 to be used by a receiving device as part of a decoding process. The parity bits 240 may be added to each CB, for example concatenating each amplitude bit 230 CB, sign information bit 220 CB, CRC bits 235, and parity bits 240.

In some examples, the data processing scheme 200 may support a sign bit scrambling, where one or more sign bits may be scrambled after the FEC encoder and rate matching. That is, the first wireless device may scramble a set of sign bits associated with the TB 205. In the example, of data processing scheme 200, the one or more sign bits may include the sign information bits 220 associated with the TB 205, one or more CRC bits associated with a CB of the TB 205 (e.g., the CB CRC bits 235), one or more parity bits output after an encoding procedure (e.g., the parity bits 240 output from the FEC encoder), or a combination thereof. In some examples, the sign bits may be represented by the sequence s(0), s(1), . . . , s($N_{sign}$−1), where $N_{sign}$ may be a number of sign bits after using the FEC encoder. In such examples, the sign bit scrambling may be performed on the sign bits in accordance with a specific scrambling rule. For example, the scrambled sign bits 245 may be produced using Equation 2.

$$\hat{s}(i) = (s(i) + c(i)) \bmod 2, i = 0, \dots, N_{sign} - 1 \qquad (2)$$

In Equation 2, $N_{sign}$ may be a number of sign bits, $\hat{s}(i)$ may be an ith scrambled sign bit, s(i) may be an ith sign bit, and c(i) may be a scrambling sequence known to wireless devices.

In other examples, the sign bit scrambling may be performed on the sign bits in accordance with a scrambling rule and a scrambling sequence initialized by an index associated with the amplitude bit scrambling. That is, the first wireless device may scramble the set of sign bits based at least in part on an index value associated with a number of the set of amplitude information bits 215. For example, the scrambled sign bits 245 may be produced using Equation 3.

$$\hat{s}(i) = (s(i) + c(i + N_{amp})) \bmod 2, i = 0, \dots, N_{sign} - 1 \qquad (3)$$

In Equation 3, $\hat{s}(i)$ may be an ith scrambled sign bit, s(i) may be an ith sign bit, $N_{sign}$ may be a number of sign bits, $N_{amp}$ may be a number of amplitude bits, and c(i) may be a scrambling sequence known to wireless devices. In some examples, the first wireless device may scramble the set of sign bits based at least in part on a default index value associated with the set of sign bits (e.g., an index equal to zero).

In some examples, the first wireless device may perform a modulation procedure on an encoded set of distributed amplitude bits (e.g., output from the FEC encoder, a sign bit scrambler) in accordance with PCS scheme to obtain a codeword associated with the TB 205. Additionally or alternatively, the first wireless device may perform the modulation procedure on the scrambled set of sign bits, where the codeword may include the scrambled set of sign bits after the modulation procedure. In some examples, performing the modulation procedure may include mapping the encoded set of distributed amplitude bits to one or more symbol constellations according to the PCS scheme, where the codeword may include one or more modulated symbols based at least in part on the mapping. The first wireless device may transmit the codeword associated with the TB 205 to the second wireless device.

In some examples, a receiving device (e.g., the second wireless device) may receive the codeword and may perform a decoding process to obtain a set of information bits associated with the TB 205. For example, the second wireless device may receive the codeword and perform a modulation procedure on the codeword in accordance with the PCS scheme to obtain an encoded set of distributed amplitude bits. The second wireless device may then decode the encoded set of distributed amplitude bits, perform a distribution matching procedure on the distributed amplitude bits, and descramble the amplitude bits to obtain the set of information bits associated with the TB 205.

In some examples, wireless devices configured to use, or otherwise implement, data processing scheme 200 may implement scrambling amplitude information bits 215 before inputting the DM module without scrambling sign bits. In other examples, wireless devices configured to use, or otherwise implement, data processing scheme 200 may implement scrambling sign bits after using the FEC encoder without scrambling amplitude information bits 215. However, devices configured to both scramble amplitude information bits 215 before the DM module and scramble sign bits after the FEC encoder may experience more enhanced symbol randomization compared to devices scrambling either amplitude information bits 215 or the sign bits.

Configuring devices to scramble information bits in accordance with data processing scheme 200 may support scrambling for PCS systems to maintain a target symbol distribution while suppressing channel interference by retaining a transmit symbol randomization.

FIG. 3A illustrates an example of a data processing scheme 300 that supports scrambling for probabilistic constellation schemes in wireless communications in accordance with aspects of the present disclosure. The data processing scheme 300 may implement or be implemented by aspects of the wireless communications system 100. For example, the PCS Manager 101-a, the PCS Manager 101-b, or both, may use data processing scheme 300 when preparing signals to be transmitted. In some examples, wireless devices may perform scrambling in scenarios where a DM module 315-a is implemented after an FEC encoder 305-a.

In some examples, for a PCS structure where a shaping encoder (e.g., PCS encoder 310-a) is after the FEC encoder 305-a, wireless devices may implement scrambling 320-a before or after the PCS encoder 310-a. In the example of data processing scheme 300, scrambling 320-a may be implemented after the PCS encoder 310-a, but before modulation 325-a.

In some examples, wireless devices implementing the data processing scheme 300 may input one or more systematic bits into the FEC encoder 305-a, where the FEC encoder 305-a may output FEC encoded data (e.g., with attached parity bits). That is, a first wireless device may encode a set of information bits of a TB for transmission to a second wireless device. Wireless devices using data processing scheme 300 may determine whether to implement scrambling 320-a before or after the PCS encoder 310-a, where in the case of data processing scheme 300, such devices may determine to implement scrambling 320-a after the PCS encoder 310-a. That is, the first wireless device may scramble the encoded set of distributed bits after the distribution matching procedure. In such examples, the FEC encoder 305-a may output the FEC encoded data to the PCS encoder 310-a. As such, the first wireless device may perform a distribution matching procedure on the encoded set of information bits according to a PCS scheme to obtain an encoded set of distributed bits. In some examples, the PCS encoder 310-a may include a DM module 315-a, and as such, the PCS encoder 310-a may implement at least a DM step. In some cases, the PCS encoder 310-a may use a look-up table (LUT) to implement a shaping encoder, where the PCS encoder 310-a may map a set of bits to a respective constellation symbol. For example, the PCS encoder 310-a may use an 8PAM mapping function to implement the shaping encoder, referencing Table 1 for mapping the bits to constellation symbols

TABLE 1

| Constellation Symbol X | −7 | −5 | −3 | −1 | 1 | 3 | 5 | 7 |
|---|---|---|---|---|---|---|---|---|
| Bit Label | 0 | 0 | 0 | 1 | 1 | 0 | 0 | 0 |
| | 0 | 0 | 1 | 0 | 1 | 1 | 0 | 0 |
| | 1 | 1 | 0 | X | X | 1 | 0 | 1 |
| | 1 | 0 | X | X | X | X | X | 1 |
| | 1 | X | X | X | X | X | X | 0 |
| p(X) | $2^{-5}$ | $2^{-4}$ | $2^{-3}$ | $2^{-2}$ | $2^{-2}$ | $2^{-3}$ | $2^{-4}$ | $2^{-5}$ |

In Table 1, the constellation symbol X row represents constellation symbols associated with respective bit labels. In some cases, p(X) may represent a probability of mapping each constellation symbol. As an example, the PCS encoder 310-a may take bits output from the FEC encoder 305-a, for example, with bit label "11," where the PCS encoder 310-a may map the bits to the constellation symbol "1." The constellation symbol "1" may have a $2^{-2}$ chance, or a 25 percent chance of being mapped.

In some examples, scrambling 320-a may occur after implementing the PCS encoder 310-a. Compared to data processing scheme 200 as described with reference to FIG. 2, in data processing scheme 300, devices may refrain from separating amplitude bits and sign bits such that the scrambling 320-a may be performed on the bits output from the PCS encoder 310-a irrespective of amplitude or sign.

In some examples, the scrambled bits output from scrambling 320-a may be sent to modulation 325-a, where the scrambled bits may be modulated, for example with a specific QAM scheme, phase shift keying scheme, among other modulation schemes. Phrased alternatively, the first wireless device may modulate the encoded set of distributed bits based at least in part on one or more constellations associated with the probabilistic constellation shaping scheme to obtain a codeword associated with the TB.

Further, modulating the encoded set of distributed bits comprises modulating the scrambled encoded set of distributed bits.

In some examples, the first wireless device may transmit the codeword to a second wireless device. Likewise, the second wireless device may receive the codeword and may perform a decoding procedure on the codeword to obtain a set of information bits associated with the TB. For example, the second wireless device may receive the codeword, demodulate the codeword, perform a distribution matching procedure on an encoded set of distributed bits output from the demodulating procedure, and may decode the encoded set of information bits to obtain a set of information bits associated with the TB.

FIG. 3B illustrates an example of a data processing scheme 301 that supports scrambling for probabilistic constellation schemes in wireless communications in accordance with aspects of the present disclosure. The data processing scheme 301 may implement or be implemented by aspects of the wireless communications system 100. For example, the PCS Manager 101-a, the PCS Manager 101-b, or both, may use data processing scheme 301 when preparing signals to be transmitted. In some examples, wireless devices may perform scrambling in scenarios where a DM module 315-b is implemented after an FEC encoder 305-b.

In some examples, for a PCS structure where a shaping encoder (e.g., PCS encoder 310-a) is after the FEC encoder 305-b, wireless devices may implement scrambling 320-b before or after the PCS encoder 310-b. In the example of data processing scheme 301, scrambling 320-b may be implemented before the PCS encoder 310-b.

In some examples, wireless devices implementing the data processing scheme 301 may input one or more systematic bits into the FEC encoder 305-b, where the FEC encoder 305-b may output FEC encoded data (e.g., with attached parity bits). That is, a first wireless device may encode a set of information bits of a TB for transmission to a second wireless device. Wireless devices using data processing scheme 301 may determine whether to implement scrambling 320-b before or after the PCS encoder 310-b, where in the case of data processing scheme 301, such devices may determine to implement scrambling 320-b before the PCS encoder 310-b. That is, the first wireless device may scramble the encoded set of distributed bits before the distribution matching procedure. In such examples, the FEC encoder 305-b may output the FEC encoded data to the scrambling 320-b, where the scrambling 320-b may scramble the FEC encoded data. Compared to data processing scheme 200 as described with reference to FIG. 2, in data processing scheme 301, devices may refrain from separating amplitude bits and sign bits such that the scrambling 320-b may be performed on the bits output from the FEC encoder 305-b irrespective of amplitude or sign.

In some examples, the scrambled bits output from scrambling 320-b may be input into the PCS encoder 310-b. In some examples, the PCS encoder 310-b may include a DM module 315-b, and as such, the PCS encoder 310-b may implement at least a DM step. That is, the first wireless device may perform a distribution matching procedure on the scrambled encoded set of distributed bits. In some cases, the PCS encoder 310-b may use an LUT to implement a shaping encoder, where the PCS encoder 310-b may map a set of bits to a respective constellation symbol. For example, the PCS encoder 310-b may use an 8PAM mapping function to implement the shaping encoder, referencing Table 1 for mapping the bits to constellation symbols.

In some examples, the bits output from the PCS encoder 310-b may be sent to modulation 325-a, where the scrambled bits may be modulated, for example with a specific QAM scheme, phase shift keying scheme, among other modulation schemes. Phrased alternatively, the first wireless device may modulate the encoded set of distributed bits based at least in part on one or more constellations associated with the probabilistic constellation shaping scheme to obtain a codeword associated with the TB. Further, modulating the encoded set of distributed bits comprises modulating the scrambled encoded set of distributed bits.

In some examples, the first wireless device may transmit the codeword to a second wireless device. Likewise, the second wireless device may receive the codeword and may perform a decoding procedure on the codeword to obtain a set of information bits associated with the TB. For example, the second wireless device may receive the codeword, demodulate the codeword, perform a distribution matching procedure on an encoded set of distributed bits output from the demodulating procedure, and may decode the encoded set of information bits to obtain a set of information bits associated with the TB.

Figure 4:
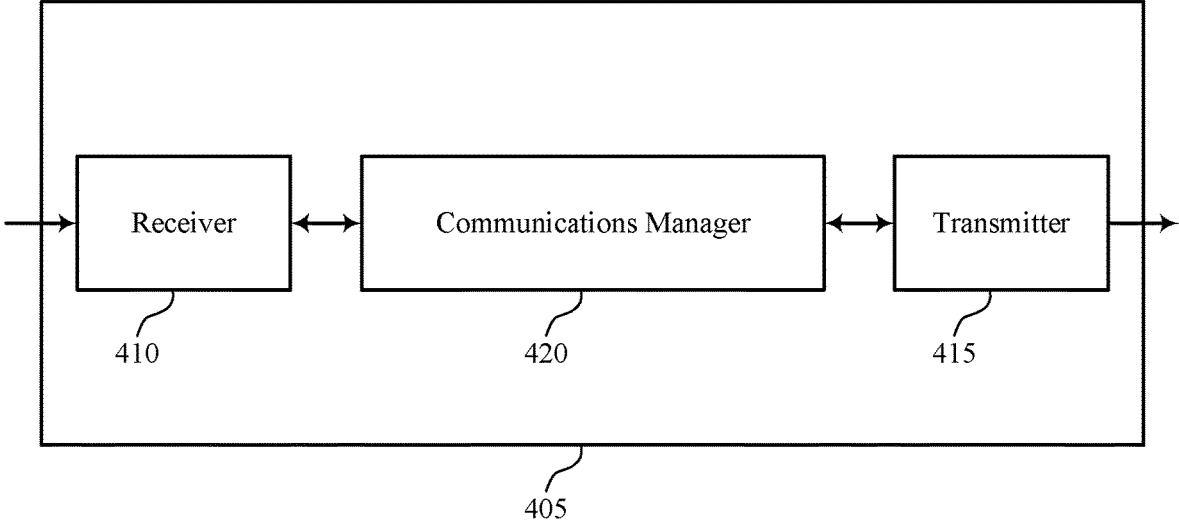
FIGS. 4 and 5 show block diagrams of devices that support scrambling for probabilistic constellation schemes in wireless communications in accordance with aspects of the present disclosure.

FIG. 4 shows a block diagram 400 of a device 405 that supports scrambling for probabilistic constellation schemes in wireless communications in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to scrambling for probabilistic constellation schemes in wireless communications). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to scrambling for probabilistic constellation schemes in wireless communications). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of scrambling for probabilistic constellation schemes in wireless communications as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a first wireless device in accordance with examples as disclosed herein. For example, the communications manager 420 may be configured as or otherwise support a means for scrambling a set of amplitude information bits associated with a transport block for transmission to a second wireless device. The communications manager 420 may be configured as or otherwise support a means for performing a distribution matching procedure on the scrambled set of amplitude information bits to obtain a set of distributed amplitude bits. The communications manager 420 may be configured as or otherwise support a means for encoding the set of distributed amplitude bits. The communications manager 420 may be configured as or otherwise support a means for performing a modulation procedure on the encoded set of distributed amplitude bits in accordance with a probabilistic constellation shaping scheme to obtain a codeword associated with the transport block. The communications manager 420 may be configured as or otherwise support a means for transmitting the codeword to the second wireless device.

Additionally or alternatively, the communications manager 420 may support wireless communications at a first wireless device in accordance with examples as disclosed herein. For example, the communications manager 420 may be configured as or otherwise support a means for encoding a set of information bits of a transport block for transmission to a second wireless device. The communications manager 420 may be configured as or otherwise support a means for performing a distribution matching procedure on the encoded set of information bits according to a probabilistic constellation shaping scheme to obtain an encoded set of distributed bits. The communications manager 420 may be configured as or otherwise support a means for modulating the encoded set of distributed bits based on one or more constellations associated with the probabilistic constellation shaping scheme to obtain a codeword associated with the transport block. The communications manager 420 may be configured as or otherwise support a means for transmitting the codeword to the second wireless device.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for scrambling for PCS systems to maintain a target symbol distribution while suppressing channel interference by retaining a transmit symbol randomization, resulting in reduced processing, reduced power consumption, and more efficient utilization of communication resources.

Figure 5:
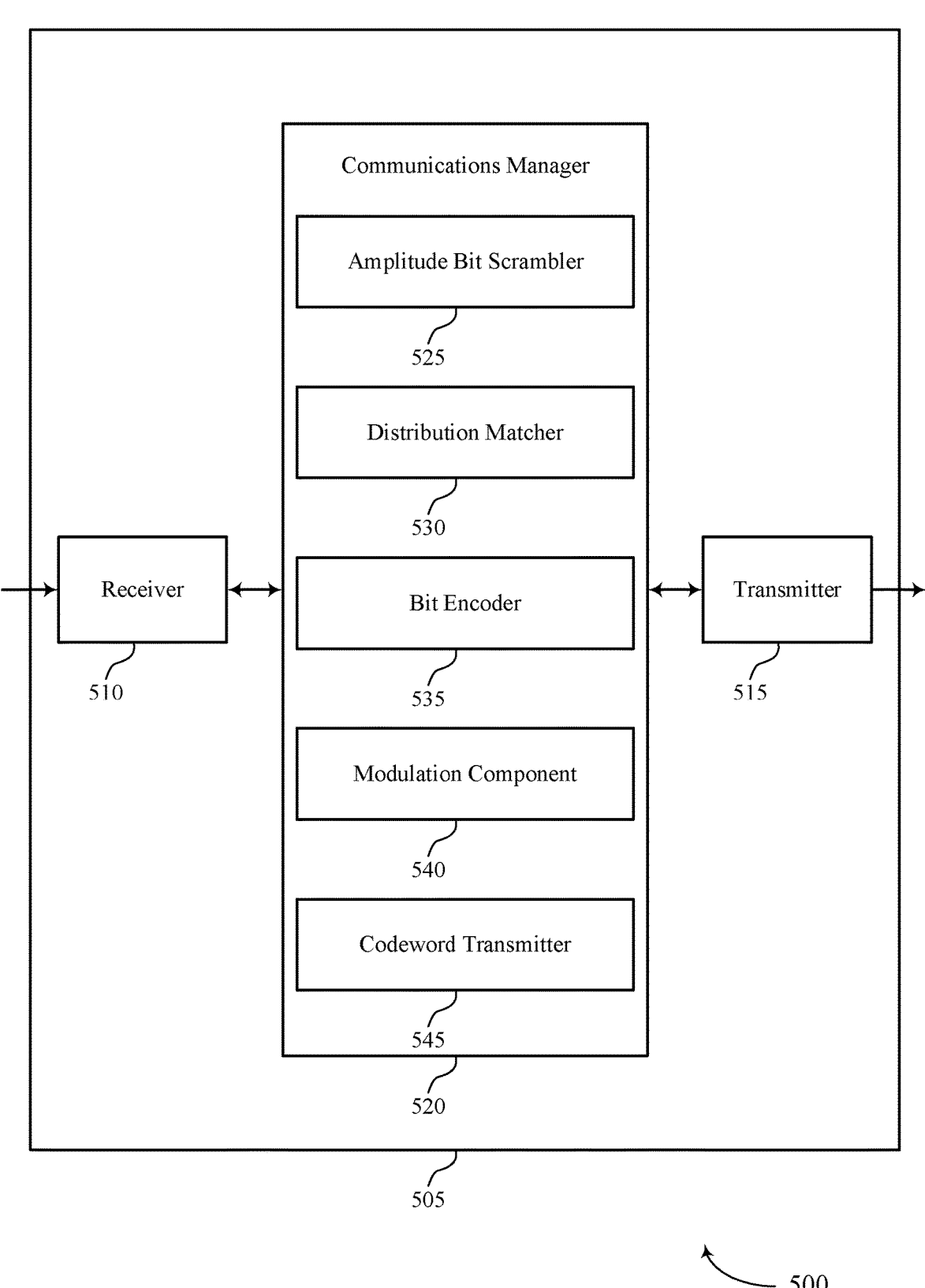

FIG. 5 shows a block diagram 500 of a device 505 that supports scrambling for probabilistic constellation schemes in wireless communications in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to scrambling for probabilistic constellation schemes in wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to scrambling for probabilistic constellation schemes in wireless communications). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of scrambling for probabilistic constellation schemes in wireless communications as described herein. For example, the communications manager 520 may include an amplitude bit scrambler 525, a distribution matcher 530, a bit encoder 535, a modulation component 540, a codeword transmitter 545, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first wireless device in accordance with examples as disclosed herein. The amplitude bit scrambler 525 may be configured as or otherwise support a means for scrambling a set of amplitude information bits associated with a transport block for transmission to a second wireless device. The distribution matcher 530 may be configured as or otherwise support a means for performing a distribution matching procedure on the scrambled set of amplitude information bits to obtain a set of distributed amplitude bits. The bit encoder 535 may be configured as or otherwise support a means for encoding the set of distributed amplitude bits. The modulation component 540 may be configured as or otherwise support a means for performing a modulation procedure on the encoded set of distributed amplitude bits in accordance with a probabilistic constellation shaping scheme to obtain a codeword associated with the transport block. The codeword transmitter 545 may be configured as or otherwise support a means for transmitting the codeword to the second wireless device.

Additionally or alternatively, the communications manager 520 may support wireless communications at a first wireless device in accordance with examples as disclosed herein. The bit encoder 535 may be configured as or otherwise support a means for encoding a set of information bits of a transport block for transmission to a second wireless device. The distribution matcher 530 may be configured as or otherwise support a means for performing a distribution matching procedure on the encoded set of information bits according to a probabilistic constellation shaping scheme to obtain an encoded set of distributed bits. The modulation component 540 may be configured as or otherwise support a means for modulating the encoded set of distributed bits based on one or more constellations associated with the probabilistic constellation shaping scheme to obtain a codeword associated with the transport block. The codeword transmitter 545 may be configured as or otherwise support a means for transmitting the codeword to the second wireless device.

Figure 6:
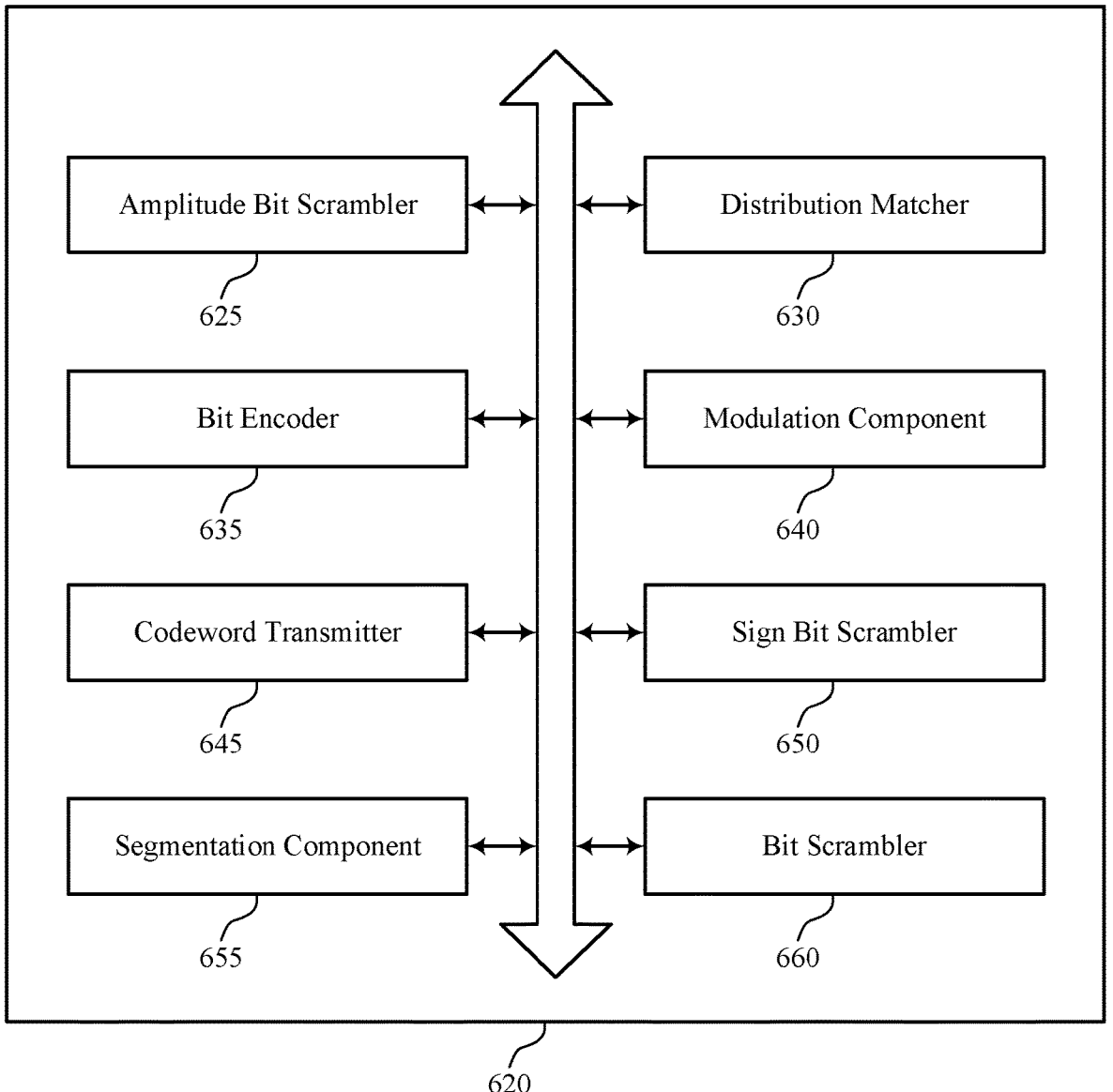
FIG. 6 shows a block diagram of a communications manager that supports scrambling for probabilistic constellation schemes in wireless communications in accordance with aspects of the present disclosure.

FIG. 6 shows a block diagram 600 of a communications manager 620 that supports scrambling for probabilistic constellation schemes in wireless communications in accordance with aspects of the present disclosure. The communications manager 620 may be an example of aspects of a communications manager 420, a communications manager 520, or both, as described herein. The communications manager 620, or various components thereof, may be an example of means for performing various aspects of scrambling for probabilistic constellation schemes in wireless communications as described herein. For example, the communications manager 620 may include an amplitude bit scrambler 625, a distribution matcher 630, a bit encoder 635, a modulation component 640, a codeword transmitter 645, a sign bit scrambler 650, a segmentation component 655, a bit scrambler 660, or any combination thereof. Each of these components may communicate, directly or indirectly, with one another (e.g., via one or more buses).

The communications manager 620 may support wireless communications at a first wireless device in accordance with examples as disclosed herein. The amplitude bit scrambler 625 may be configured as or otherwise support a means for scrambling a set of amplitude information bits associated with a transport block for transmission to a second wireless device. The distribution matcher 630 may be configured as or otherwise support a means for performing a distribution matching procedure on the scrambled set of amplitude information bits to obtain a set of distributed amplitude bits.

The bit encoder 635 may be configured as or otherwise support a means for encoding the set of distributed amplitude bits. The modulation component 640 may be configured as or otherwise support a means for performing a modulation procedure on the encoded set of distributed amplitude bits in accordance with a probabilistic constellation shaping scheme to obtain a codeword associated with the transport block. The codeword transmitter 645 may be configured as or otherwise support a means for transmitting the codeword to the second wireless device.

In some examples, the sign bit scrambler 650 may be configured as or otherwise support a means for scrambling a set of sign bits associated with the transport block. In some examples, the modulation component 640 may be configured as or otherwise support a means for performing the modulation procedure on the scrambled set of sign bits, where the codeword includes the scrambled set of sign bits after the modulation procedure.

In some examples, to support scrambling the set of sign bits, the sign bit scrambler 650 may be configured as or otherwise support a means for scrambling the set of sign bits based on an index value associated with a number of the set of amplitude information bits.

In some examples, to support scrambling the set of sign bits, the sign bit scrambler 650 may be configured as or otherwise support a means for scrambling the set of sign bits based on a default index value associated with the set of sign bits.

In some examples, the set of sign bits includes one or more sign bits associated with the transport block, one or more cyclic redundancy check bits associated with a code block of the transport block, one or more parity check bits output after an encoding procedure, or a combination thereof.

In some examples, to support performing the modulation procedure, the modulation component 640 may be configured as or otherwise support a means for mapping the encoded set of distributed amplitude bits to one or more symbol constellations according to the probabilistic constellation shaping scheme, where the codeword includes one or more modulated symbols based on the mapping.

In some examples, the segmentation component 655 may be configured as or otherwise support a means for segmenting the set of distributed amplitude bits into a set of multiple code blocks. In some examples, the bit encoder 635 may be configured as or otherwise support a means for encoding the set of multiple code blocks as part of encoding the set of distributed amplitude bits.

Additionally or alternatively, the communications manager 620 may support wireless communications at a first wireless device in accordance with examples as disclosed herein. In some examples, the bit encoder 635 may be configured as or otherwise support a means for encoding a set of information bits of a transport block for transmission to a second wireless device. In some examples, the distribution matcher 630 may be configured as or otherwise support a means for performing a distribution matching procedure on the encoded set of information bits according to a probabilistic constellation shaping scheme to obtain an encoded set of distributed bits. In some examples, the modulation component 640 may be configured as or otherwise support a means for modulating the encoded set of distributed bits based on one or more constellations associated with the probabilistic constellation shaping scheme to obtain a codeword associated with the transport block. In some examples, the codeword transmitter 645 may be configured as or otherwise support a means for transmitting the codeword to the second wireless device.

In some examples, the bit scrambler 660 may be configured as or otherwise support a means for scrambling the encoded set of distributed bits after the distribution matching procedure, where the modulating the encoded set of distributed bits includes modulating the scrambled encoded set of distributed bits.

In some examples, the bit scrambler 660 may be configured as or otherwise support a means for scrambling the encoded set of distributed bits before the distribution matching procedure, where the distribution matching procedure is performed on the scrambled encoded set of distributed bits.

Figure 7:
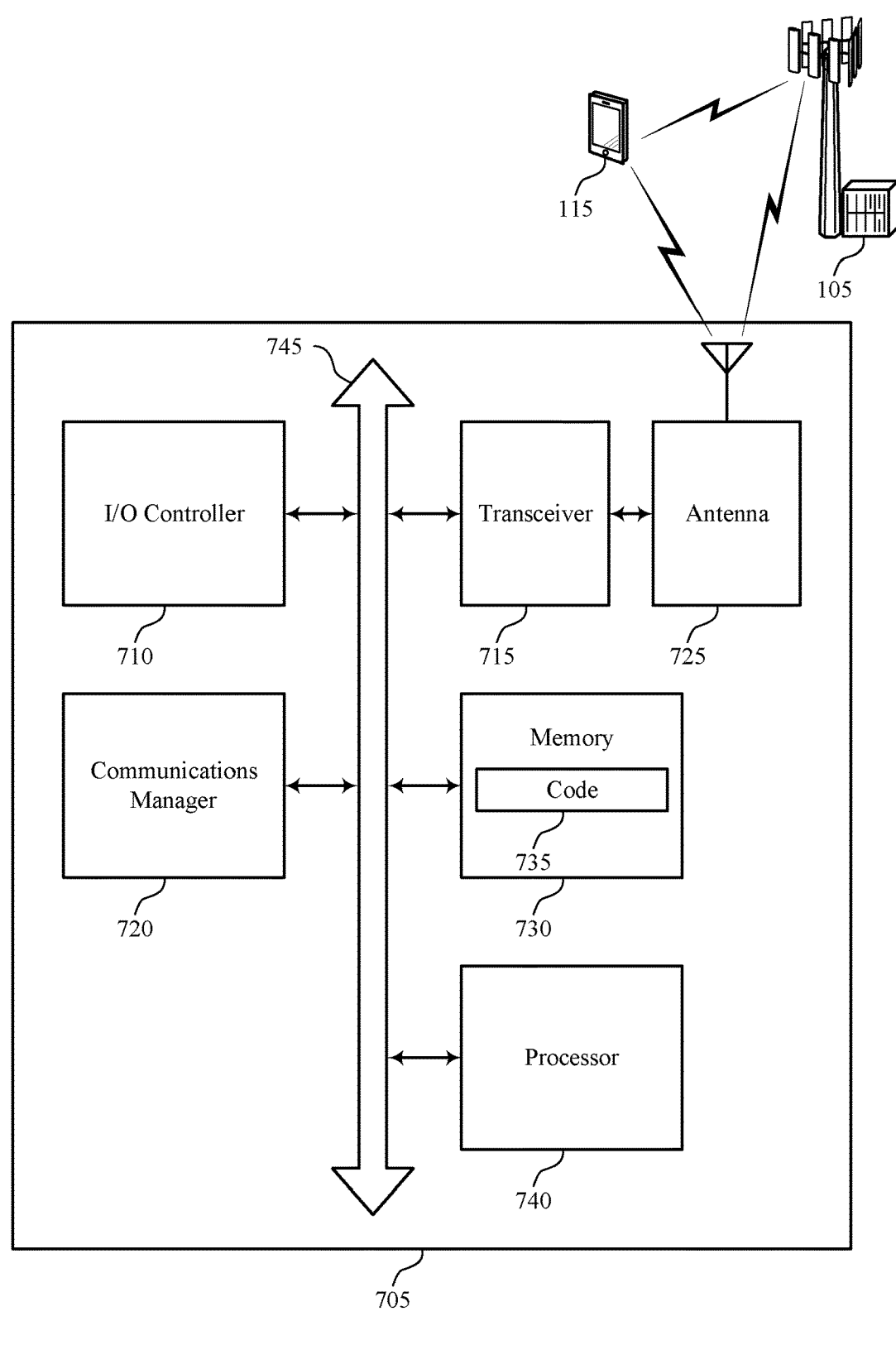
FIG. 7 shows a diagram of a system including a device that supports scrambling for probabilistic constellation schemes in wireless communications in accordance with aspects of the present disclosure.

FIG. 7 shows a diagram of a system 700 including a device 705 that supports scrambling for probabilistic constellation schemes in wireless communications in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting scrambling for probabilistic constellation schemes in wireless communications). For example, the device 705 or a component of the device 705 may include a processor 740 and memory 730 coupled to the processor 740, the processor 740 and memory 730 configured to perform various functions described herein.

The communications manager 720 may support wireless communications at a first wireless device in accordance with examples as disclosed herein. For example, the communications manager 720 may be configured as or otherwise support a means for scrambling a set of amplitude information bits associated with a transport block for transmission to a second wireless device. The communications manager 720 may be configured as or otherwise support a means for performing a distribution matching procedure on the scrambled set of amplitude information bits to obtain a set of distributed amplitude bits. The communications manager 720 may be configured as or otherwise support a means for encoding the set of distributed amplitude bits. The communications manager 720 may be configured as or otherwise support a means for performing a modulation procedure on the encoded set of distributed amplitude bits in accordance with a probabilistic constellation shaping scheme to obtain a codeword associated with the transport block. The communications manager 720 may be configured as or otherwise support a means for transmitting the codeword to the second wireless device.

Additionally or alternatively, the communications manager 720 may support wireless communications at a first wireless device in accordance with examples as disclosed herein. For example, the communications manager 720 may be configured as or otherwise support a means for encoding a set of information bits of a transport block for transmission to a second wireless device. The communications manager 720 may be configured as or otherwise support a means for performing a distribution matching procedure on the encoded set of information bits according to a probabilistic constellation shaping scheme to obtain an encoded set of distributed bits. The communications manager 720 may be configured as or otherwise support a means for modulating the encoded set of distributed bits based on one or more constellations associated with the probabilistic constellation shaping scheme to obtain a codeword associated with the transport block. The communications manager 720 may be configured as or otherwise support a means for transmitting the codeword to the second wireless device.

By including or configuring the communications manager 720 in accordance with examples as described herein, the device 705 may support techniques for scrambling for PCS systems to maintain a target symbol distribution while suppressing channel interference by retaining a transmit symbol randomization, resulting in improved communication reliability, more efficient utilization of communication resources, improved coordination between devices, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of scrambling for probabilistic constellation schemes in wireless communications as described herein, or the processor 740 and the memory 730 may be otherwise configured to perform or support such operations.

Figure 8:
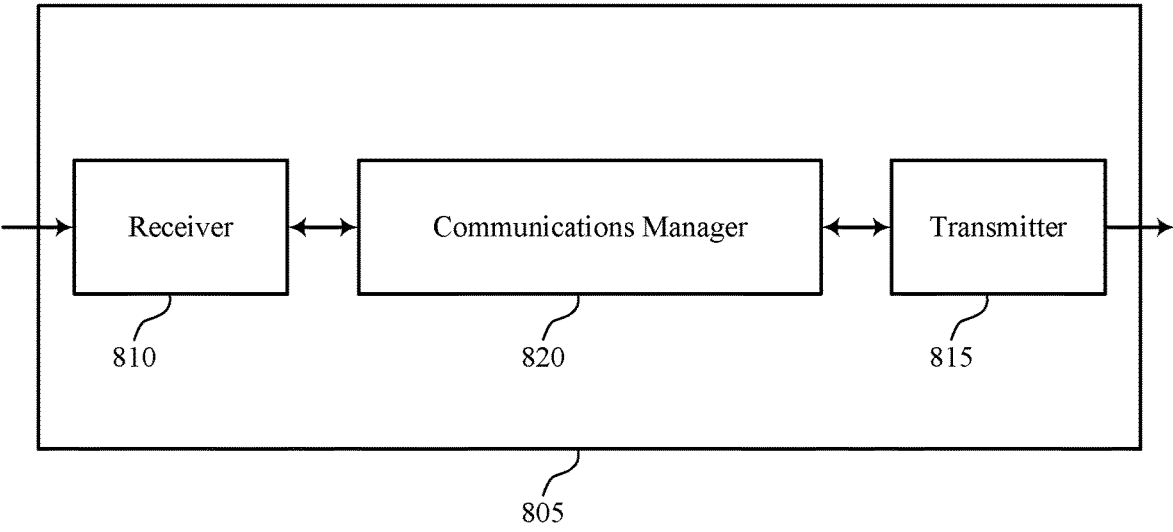
FIGS. 8 and 9 show block diagrams of devices that support scrambling for probabilistic constellation schemes in wireless communications in accordance with aspects of the present disclosure.

FIG. 8 shows a block diagram 800 of a device 805 that supports scrambling for probabilistic constellation schemes in wireless communications in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to scrambling for probabilistic constellation schemes in wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to scrambling for probabilistic constellation schemes in wireless communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of scrambling for probabilistic constellation schemes in wireless communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first device in accordance with examples as disclosed herein. For example, the communications manager 820 may be configured as or otherwise support a means for receiving, from a second wireless device, a codeword associated with a transport block. The communications manager 820 may be configured as or otherwise support a means for performing a modulation procedure on the codeword in accordance with a probabilistic constellation shaping scheme to obtain a codeword associated with the transport block to obtain an encoded set of distributed amplitude bits associated with the codeword. The communications manager 820 may be configured as or otherwise support a means for decoding the encoded set of distributed amplitude bits to obtain a set of distributed amplitude bits associated with the codeword. The communications manager 820 may be configured as or otherwise support a means for performing a distribution matching procedure on the distributed amplitude bits to obtain a set of scrambled amplitude bits. The communications manager 820 may be configured as or otherwise support a means for descrambling a set of scrambled amplitude bits to obtain a set of information bits associated with the transport block.

Additionally or alternatively, the communications manager 820 may support wireless communications at a first wireless device in accordance with examples as disclosed herein. For example, the communications manager 820 may be configured as or otherwise support a means for receiving, from a second wireless device, a codeword associated with a transport block. The communications manager 820 may be configured as or otherwise support a means for demodulating the codeword based on one or more constellations associated with a probabilistic constellation shaping scheme to obtain an encoded set of distributed bits associated with the transport block. The communications manager 820 may be configured as or otherwise support a means for performing a distribution matching procedure on the encoded set of distributed bits according to the probabilistic constellation shaping scheme to obtain an encoded set of information bits associated with the transport block. The communications manager 820 may be configured as or otherwise support a means for decoding the encoded set of information bits associated with the transport block to obtain a set of information bits associated with the transport block.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for scrambling for PCS systems to maintain a target symbol distribution while suppressing channel interference by retaining a transmit symbol randomization resulting in reduced processing, reduced power consumption, and more efficient utilization of communication resources.

Figure 9:
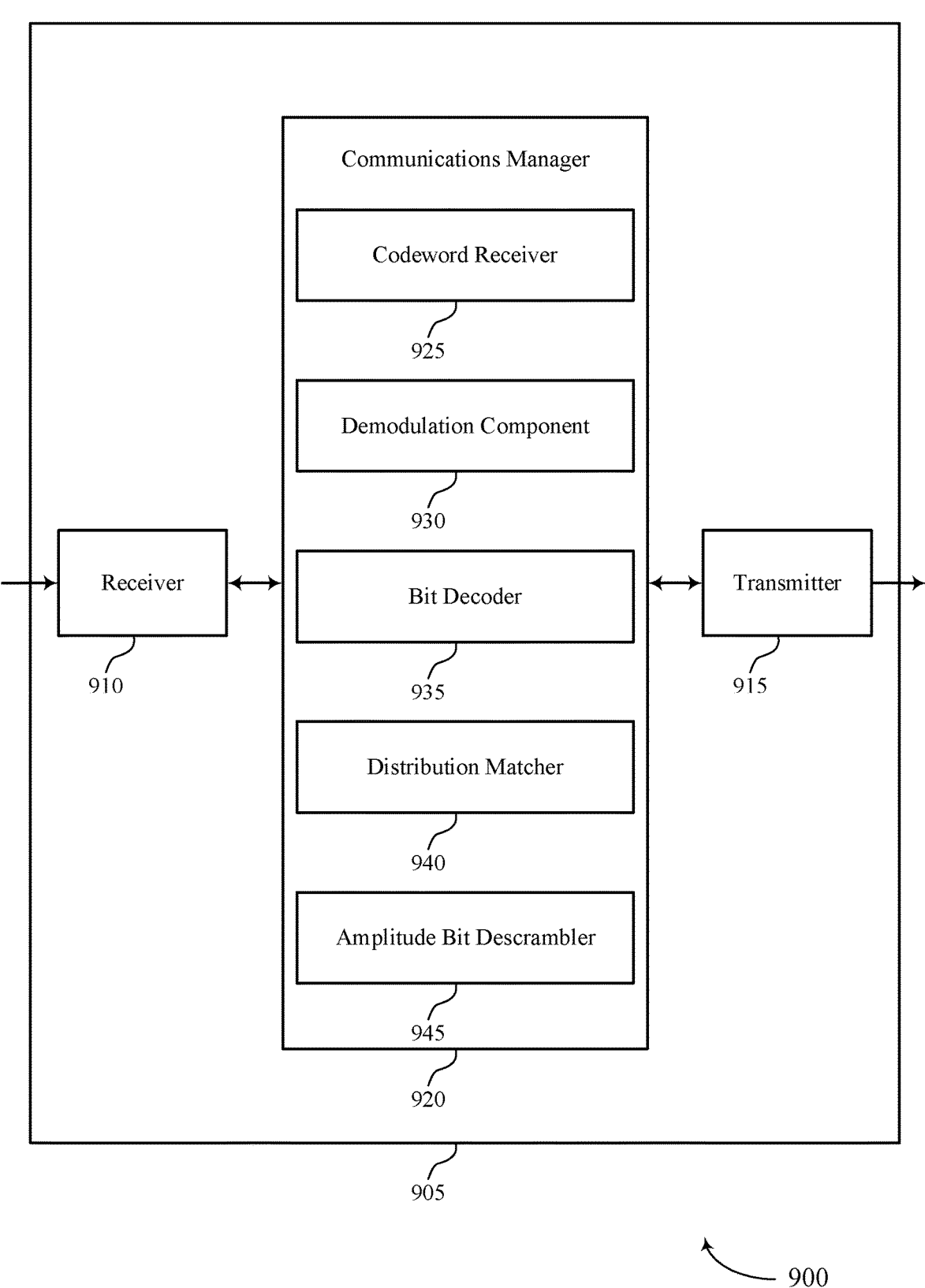

FIG. 9 shows a block diagram 900 of a device 905 that supports scrambling for probabilistic constellation schemes in wireless communications in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to scrambling for probabilistic constellation schemes in wireless communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to scrambling for probabilistic constellation schemes in wireless communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of scrambling for probabilistic constellation schemes in wireless communications as described herein. For example, the communications manager 920 may include a codeword receiver 925, a demodulation component 930, a bit decoder 935, a distribution matcher 940, an amplitude bit descrambler 945, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first device in accordance with examples as disclosed herein. The codeword receiver 925 may be configured as or otherwise support a means for receiving, from a second wireless device, a codeword associated with a transport block. The demodulation component 930 may be configured as or otherwise support a means for performing a modulation procedure on the codeword in accordance with a probabilistic constellation shaping scheme to obtain a codeword associated with the transport block to obtain an encoded set of distributed amplitude bits associated with the codeword. The bit decoder 935 may be configured as or otherwise support a means for decoding the encoded set of distributed amplitude bits to obtain a set of distributed amplitude bits associated with the codeword. The distribution matcher 940 may be configured as or otherwise support a means for performing a distribution matching procedure on the distributed amplitude bits to obtain a set of scrambled amplitude bits. The amplitude bit descrambler 945 may be configured as or otherwise support a means for descrambling a set of scrambled amplitude bits to obtain a set of information bits associated with the transport block.

Additionally or alternatively, the communications manager 920 may support wireless communications at a first wireless device in accordance with examples as disclosed herein. The codeword receiver 925 may be configured as or otherwise support a means for receiving, from a second wireless device, a codeword associated with a transport block. The demodulation component 930 may be configured as or otherwise support a means for demodulating the codeword based on one or more constellations associated with a probabilistic constellation shaping scheme to obtain an encoded set of distributed bits associated with the transport block. The distribution matcher 940 may be configured as or otherwise support a means for performing a distribution matching procedure on the encoded set of distributed bits according to the probabilistic constellation shaping scheme to obtain an encoded set of information bits associated with the transport block. The bit decoder 935 may be configured as or otherwise support a means for decoding the encoded set of information bits associated with the transport block to obtain a set of information bits associated with the transport block.

Figure 10:
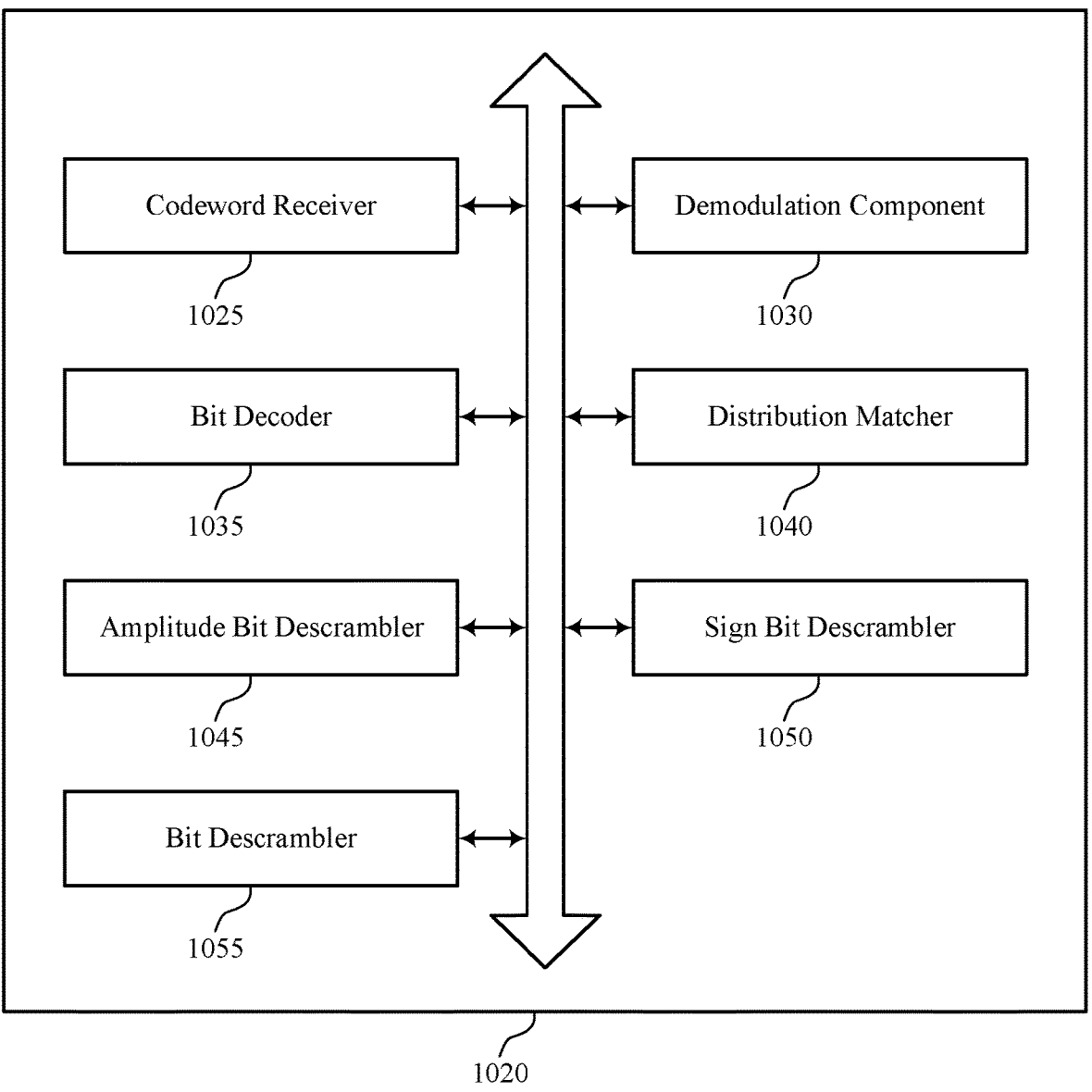
FIG. 10 shows a block diagram of a communications manager that supports scrambling for probabilistic constellation schemes in wireless communications in accordance with aspects of the present disclosure.

FIG. 10 shows a block diagram 1000 of a communications manager 1020 that supports scrambling for probabilistic constellation schemes in wireless communications in accordance with aspects of the present disclosure. The communications manager 1020 may be an example of aspects of a communications manager 820, a communications manager 920, or both, as described herein. The communications manager 1020, or various components thereof, may be an example of means for performing various aspects of scrambling for probabilistic constellation schemes in wireless communications as described herein. For example, the communications manager 1020 may include a codeword receiver 1025, a demodulation component 1030, a bit decoder 1035, a distribution matcher 1040, an amplitude bit descrambler 1045, a sign bit descrambler 1050, a bit descrambler 1055, or any combination thereof. Each of these components may communicate, directly or indirectly, with one another (e.g., via one or more buses).

The communications manager 1020 may support wireless communications at a first device in accordance with examples as disclosed herein. The codeword receiver 1025 may be configured as or otherwise support a means for receiving, from a second wireless device, a codeword associated with a transport block. The demodulation component 1030 may be configured as or otherwise support a means for performing a modulation procedure on the codeword in accordance with a probabilistic constellation shaping scheme to obtain a codeword associated with the transport block to obtain an encoded set of distributed amplitude bits associated with the codeword. The bit decoder 1035 may be configured as or otherwise support a means for decoding the encoded set of distributed amplitude bits to obtain a set of distributed amplitude bits associated with the codeword. The distribution matcher 1040 may be configured as or otherwise support a means for performing a distribution matching procedure on the distributed amplitude bits to obtain a set of scrambled amplitude bits. The amplitude bit descrambler 1045 may be configured as or otherwise support a means for descrambling a set of scrambled amplitude bits to obtain a set of information bits associated with the transport block.

In some examples, the demodulation component 1030 may be configured as or otherwise support a means for performing the modulation procedure on a scrambled set of sign bits of the codeword. In some examples, the sign bit descrambler 1050 may be configured as or otherwise support a means for descrambling the set of sign bits associated with the transport block to obtain the set of information bits.

In some examples, to support descrambling the set of sign bits, the sign bit descrambler 1050 may be configured as or otherwise support a means for descrambling the set of sign bits based on an index value associated with a number of the set of amplitude information bits.

In some examples, to support descrambling the set of sign bits, the sign bit descrambler 1050 may be configured as or otherwise support a means for descrambling the set of sign bits based on a default index value associated with the set of sign bits.

In some examples, the set of sign bits includes one or more sign bits associated with the transport block, one or more cyclic redundancy check bits associated with a code block of the transport block, one or more parity check bits output after an encoding procedure, or a combination thereof.

Additionally or alternatively, the communications manager 1020 may support wireless communications at a first wireless device in accordance with examples as disclosed herein. In some examples, the codeword receiver 1025 may be configured as or otherwise support a means for receiving, from a second wireless device, a codeword associated with a transport block. In some examples, the demodulation component 1030 may be configured as or otherwise support a means for demodulating the codeword based on one or more constellations associated with a probabilistic constellation shaping scheme to obtain an encoded set of distributed bits associated with the transport block. In some examples, the distribution matcher 1040 may be configured as or otherwise support a means for performing a distribution matching procedure on the encoded set of distributed bits according to the probabilistic constellation shaping scheme to obtain an encoded set of information bits associated with the transport block. In some examples, the bit decoder 1035 may be configured as or otherwise support a means for decoding the encoded set of information bits associated with the transport block to obtain a set of information bits associated with the transport block.

In some examples, the bit descrambler 1055 may be configured as or otherwise support a means for descrambling the encoded set of distributed bits before the distribution matching procedure.

In some examples, the bit descrambler 1055 may be configured as or otherwise support a means for descrambling the encoded set of information bits after the distribution matching procedure.

Figure 11:
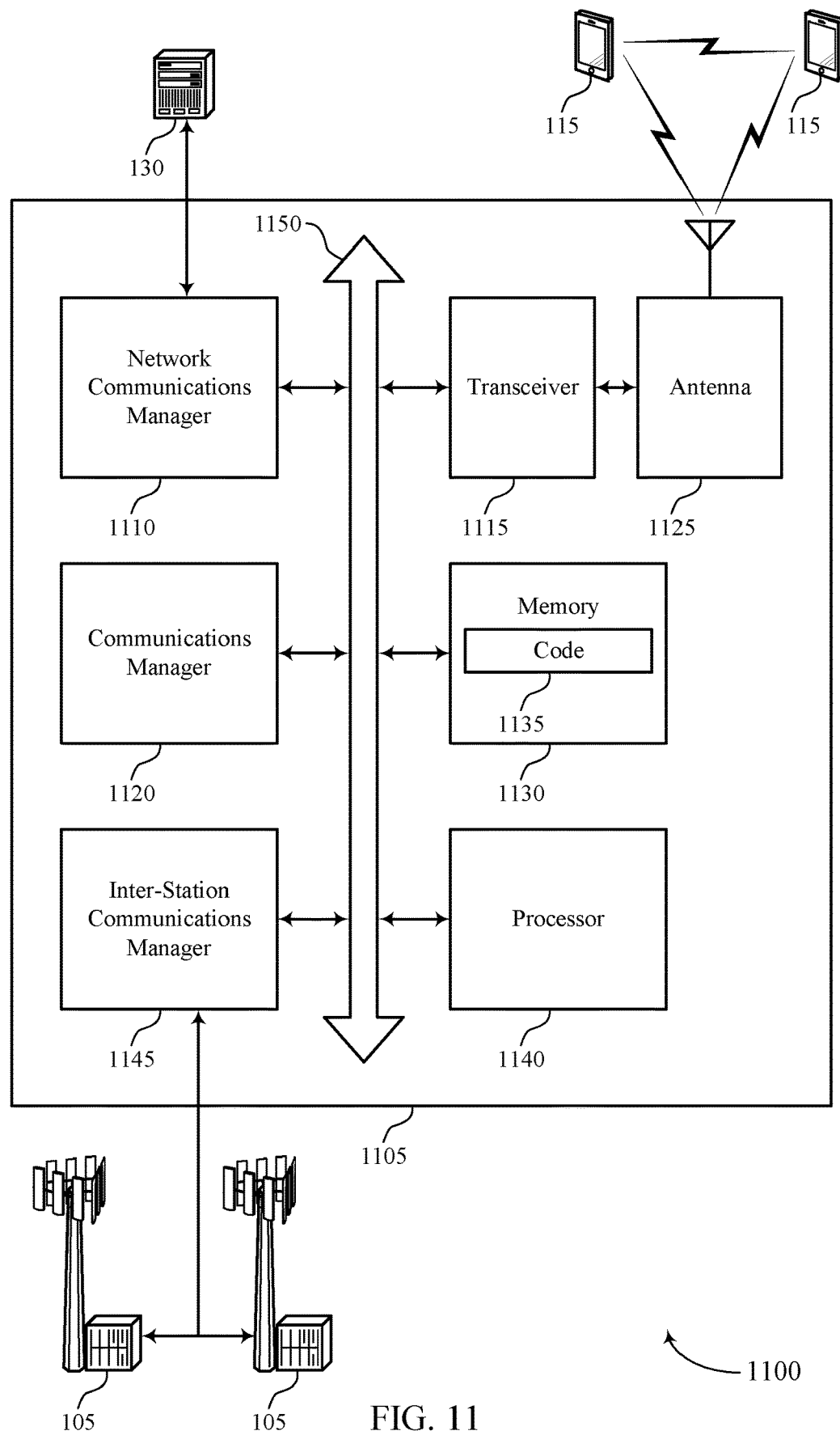
FIG. 11 shows a diagram of a system including a device that supports scrambling for probabilistic constellation schemes in wireless communications in accordance with aspects of the present disclosure.

FIG. 11 shows a diagram of a system 1100 including a device 1105 that supports scrambling for probabilistic constellation schemes in wireless communications in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting scrambling for probabilistic constellation schemes in wireless communications). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a first device in accordance with examples as disclosed herein. For example, the communications manager 1120 may be configured as or otherwise support a means for receiving, from a second wireless device, a codeword associated with a transport block. The communications manager 1120 may be configured as or otherwise support a means for performing a modulation procedure on the codeword in accordance with a probabilistic constellation shaping scheme to obtain a codeword associated with the transport block to obtain an encoded set of distributed amplitude bits associated with the codeword. The communications manager 1120 may be configured as or otherwise support a means for decoding the encoded set of distributed amplitude bits to obtain a set of distributed amplitude bits associated with the codeword. The communications manager 1120 may be configured as or otherwise support a means for performing a distribution matching procedure on the distributed amplitude bits to obtain a set of scrambled amplitude bits. The communications manager 1120 may be configured as or otherwise support a means for descrambling a set of scrambled amplitude bits to obtain a set of information bits associated with the transport block.

Additionally or alternatively, the communications manager 1120 may support wireless communications at a first wireless device in accordance with examples as disclosed herein. For example, the communications manager 1120 may be configured as or otherwise support a means for receiving, from a second wireless device, a codeword associated with a transport block. The communications manager 1120 may be configured as or otherwise support a means for demodulating the codeword based on one or more constellations associated with a probabilistic constellation shaping scheme to obtain an encoded set of distributed bits associated with the transport block. The communications manager 1120 may be configured as or otherwise support a means for performing a distribution matching procedure on the encoded set of distributed bits according to the probabilistic constellation shaping scheme to obtain an encoded set of information bits associated with the transport block. The communications manager 1120 may be configured as or otherwise support a means for decoding the encoded set of information bits associated with the transport block to obtain a set of information bits associated with the transport block.

By including or configuring the communications manager 1120 in accordance with examples as described herein, the device 1105 may support techniques for scrambling for PCS systems to maintain a target symbol distribution while suppressing channel interference by retaining a transmit symbol randomization improved communication reliability, more efficient utilization of communication resources, improved coordination between devices, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of scrambling for probabilistic constellation schemes in wireless communications as described herein, or the processor 1140 and the memory 1130 may be otherwise configured to perform or support such operations.

FIG. 12 shows a flowchart illustrating a method 1200 that supports scrambling for probabilistic constellation schemes in wireless communications in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include scrambling a set of amplitude information bits associated with a transport block for transmission to a second wireless device. The operations of 1205 may be performed in accordance with examples as disclosed herein. In some examples, aspects of the operations of 1205 may be performed by an amplitude bit scrambler 625 as described with reference to FIG. 6.

At 1210, the method may include performing a distribution matching procedure on the scrambled set of amplitude information bits to obtain a set of distributed amplitude bits. The operations of 1210 may be performed in accordance with examples as disclosed herein. In some examples, aspects of the operations of 1210 may be performed by a distribution matcher 630 as described with reference to FIG. 6.

At 1215, the method may include encoding the set of distributed amplitude bits. The operations of 1215 may be performed in accordance with examples as disclosed herein.

In some examples, aspects of the operations of 1215 may be performed by a bit encoder 635 as described with reference to FIG. 6.

At 1220, the method may include performing a modulation procedure on the encoded set of distributed amplitude bits in accordance with a probabilistic constellation shaping scheme to obtain a codeword associated with the transport block. The operations of 1220 may be performed in accordance with examples as disclosed herein. In some examples, aspects of the operations of 1220 may be performed by a modulation component 640 as described with reference to FIG. 6.

At 1225, the method may include transmitting the codeword to the second wireless device. The operations of 1225 may be performed in accordance with examples as disclosed herein. In some examples, aspects of the operations of 1225 may be performed by a codeword transmitter 645 as described with reference to FIG. 6.

Figure 13:
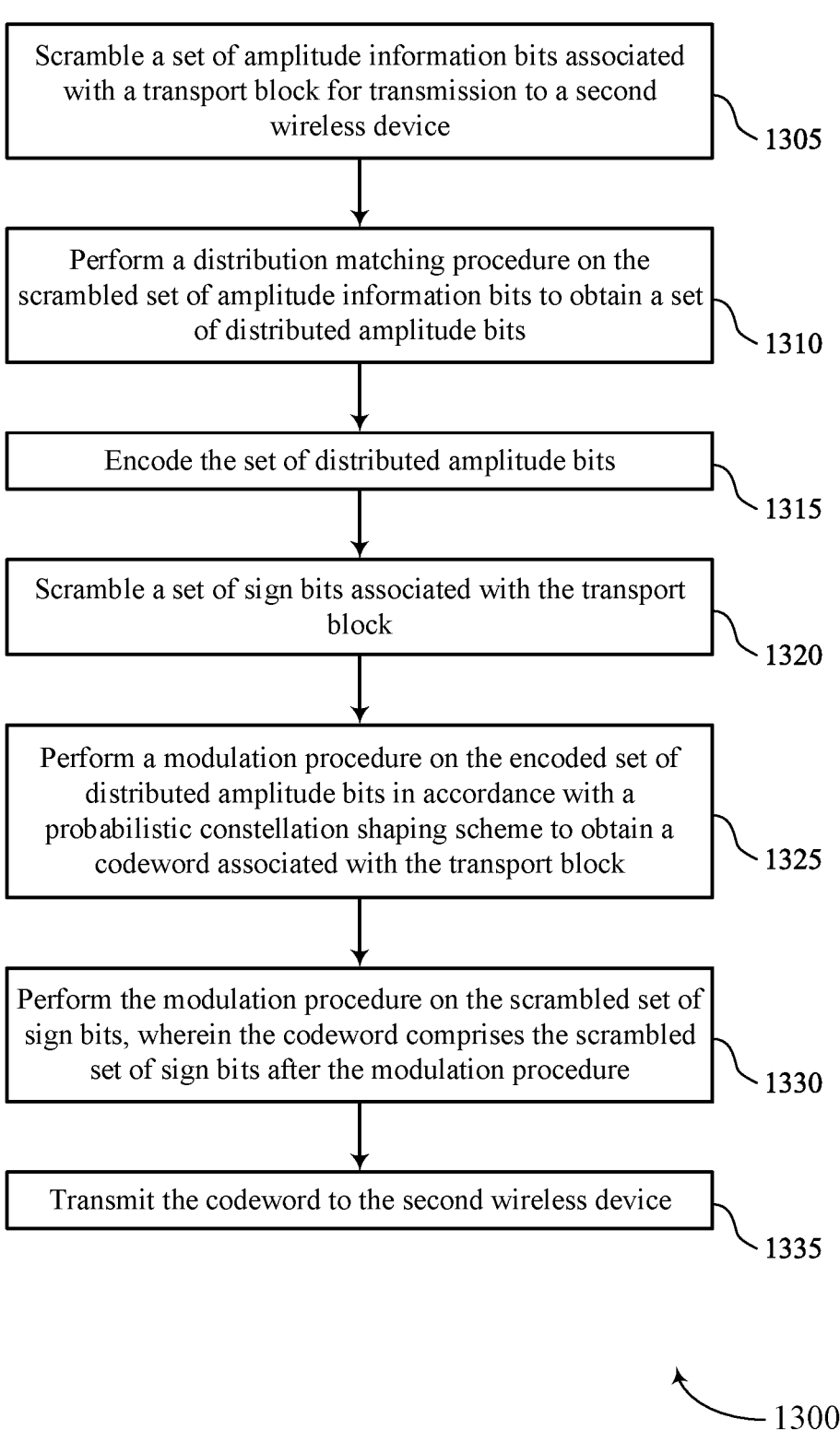

FIG. 13 shows a flowchart illustrating a method 1300 that supports scrambling for probabilistic constellation schemes in wireless communications in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include scrambling a set of amplitude information bits associated with a transport block for transmission to a second wireless device. The operations of 1305 may be performed in accordance with examples as disclosed herein. In some examples, aspects of the operations of 1305 may be performed by an amplitude bit scrambler 625 as described with reference to FIG. 6.

At 1310, the method may include performing a distribution matching procedure on the scrambled set of amplitude information bits to obtain a set of distributed amplitude bits. The operations of 1310 may be performed in accordance with examples as disclosed herein. In some examples, aspects of the operations of 1310 may be performed by a distribution matcher 630 as described with reference to FIG. 6.

At 1315, the method may include encoding the set of distributed amplitude bits. The operations of 1315 may be performed in accordance with examples as disclosed herein. In some examples, aspects of the operations of 1315 may be performed by a bit encoder 635 as described with reference to FIG. 6.

At 1320, the method may include scrambling a set of sign bits associated with the transport block. The operations of 1320 may be performed in accordance with examples as disclosed herein. In some examples, aspects of the operations of 1320 may be performed by a sign bit scrambler 650 as described with reference to FIG. 6.

At 1325, the method may include performing a modulation procedure on the encoded set of distributed amplitude bits in accordance with a probabilistic constellation shaping scheme to obtain a codeword associated with the transport block. The operations of 1325 may be performed in accordance with examples as disclosed herein.

In some examples, aspects of the operations of 1325 may be performed by a modulation component 640 as described with reference to FIG. 6.

At 1330, the method may include performing the modulation procedure on the scrambled set of sign bits, where the codeword includes the scrambled set of sign bits after the modulation procedure. The operations of 1330 may be performed in accordance with examples as disclosed herein. In some examples, aspects of the operations of 1330 may be performed by a modulation component 640 as described with reference to FIG. 6.

At 1335, the method may include transmitting the codeword to the second wireless device. The operations of 1335 may be performed in accordance with examples as disclosed herein. In some examples, aspects of the operations of 1335 may be performed by a codeword transmitter 645 as described with reference to FIG. 6.

FIG. 14 shows a flowchart illustrating a method 1400 that supports scrambling for probabilistic constellation schemes in wireless communications in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include encoding a set of information bits of a transport block for transmission to a second wireless device. The operations of 1405 may be performed in accordance with examples as disclosed herein. In some examples, aspects of the operations of 1405 may be performed by a bit encoder 635 as described with reference to FIG. 6.

At 1410, the method may include performing a distribution matching procedure on the encoded set of information bits according to a probabilistic constellation shaping scheme to obtain an encoded set of distributed bits. The operations of 1410 may be performed in accordance with examples as disclosed herein. In some examples, aspects of the operations of 1410 may be performed by a distribution matcher 630 as described with reference to FIG. 6.

At 1415, the method may include modulating the encoded set of distributed bits based on one or more constellations associated with the probabilistic constellation shaping scheme to obtain a codeword associated with the transport block. The operations of 1415 may be performed in accordance with examples as disclosed herein. In some examples, aspects of the operations of 1415 may be performed by a modulation component 640 as described with reference to FIG. 6.

At 1420, the method may include transmitting the codeword to the second wireless device. The operations of 1420 may be performed in accordance with examples as disclosed herein. In some examples, aspects of the operations of 1420 may be performed by a codeword transmitter 645 as described with reference to FIG. 6.

Figure 15:
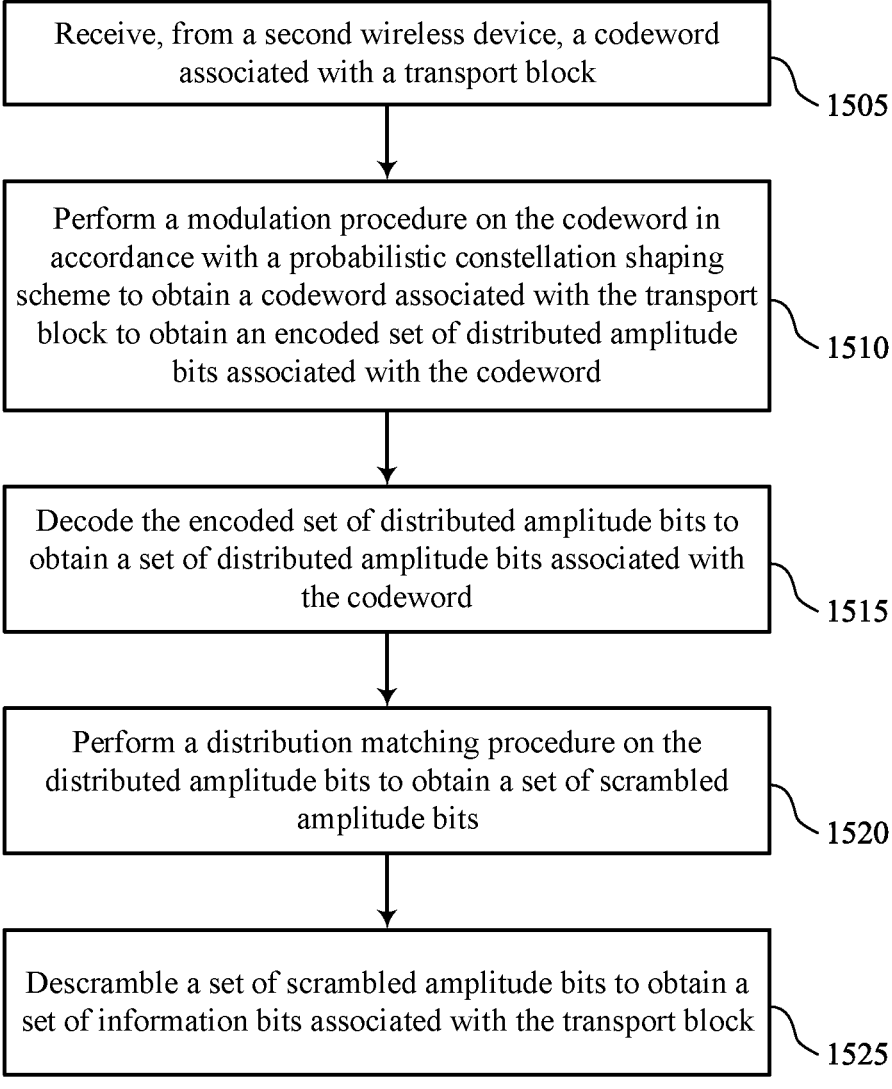

FIG. 15 shows a flowchart illustrating a method 1500 that supports scrambling for probabilistic constellation schemes in wireless communications in accordance with aspects of the present disclosure. The operations of the method 1500 may be implemented by a base station or its components as described herein. For example, the operations of the method 1500 may be performed by a base station 105 as described with reference to FIGS. 1 through 3B and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving, from a second wireless device, a codeword associated with a transport block. The operations of 1505 may be performed in accordance with examples as disclosed herein. In some examples, aspects of the operations of 1505 may be performed by a codeword receiver 1025 as described with reference to FIG. 10.

At 1510, the method may include performing a modulation procedure on the codeword in accordance with a probabilistic constellation shaping scheme to obtain a codeword associated with the transport block to obtain an encoded set of distributed amplitude bits associated with the codeword. The operations of 1510 may be performed in accordance with examples as disclosed herein. In some examples, aspects of the operations of 1510 may be performed by a demodulation component 1030 as described with reference to FIG. 10.

At 1515, the method may include decoding the encoded set of distributed amplitude bits to obtain a set of distributed amplitude bits associated with the codeword. The operations of 1515 may be performed in accordance with examples as disclosed herein. In some examples, aspects of the operations of 1515 may be performed by a bit decoder 1035 as described with reference to FIG. 10.

At 1520, the method may include performing a distribution matching procedure on the distributed amplitude bits to obtain a set of scrambled amplitude bits. The operations of 1520 may be performed in accordance with examples as disclosed herein. In some examples, aspects of the operations of 1520 may be performed by a distribution matcher 1040 as described with reference to FIG. 10.

At 1525, the method may include descrambling a set of scrambled amplitude bits to obtain a set of information bits associated with the transport block. The operations of 1525 may be performed in accordance with examples as disclosed herein. In some examples, aspects of the operations of 1525 may be performed by an amplitude bit descrambler 1045 as described with reference to FIG. 10.

FIG. 16 shows a flowchart illustrating a method 1600 that supports scrambling for probabilistic constellation schemes in wireless communications in accordance with aspects of the present disclosure. The operations of the method 1600 may be implemented by a base station or its components as described herein. For example, the operations of the method 1600 may be performed by a base station 105 as described with reference to FIGS. 1 through 3B and 8 through 11. In some examples, a base station may execute a set of instructions to control the functional elements of the base station to perform the described functions. Additionally or alternatively, the base station may perform aspects of the described functions using special-purpose hardware.

At 1605, the method may include receiving, from a second wireless device, a codeword associated with a transport block. The operations of 1605 may be performed in accordance with examples as disclosed herein. In some examples, aspects of the operations of 1605 may be performed by a codeword receiver 1025 as described with reference to FIG. 10.

At 1610, the method may include performing a modulation procedure on the codeword in accordance with a probabilistic constellation shaping scheme to obtain a codeword associated with the transport block to obtain an encoded set of distributed amplitude bits associated with the codeword. The operations of 1610 may be performed in accordance with examples as disclosed herein. In some examples, aspects of the operations of 1610 may be performed by a demodulation component 1030 as described with reference to FIG. 10.

At 1615, the method may include performing the modulation procedure on a scrambled set of sign bits of the codeword. The operations of 1615 may be performed in accordance with examples as disclosed herein. In some examples, aspects of the operations of 1615 may be performed by a demodulation component 1030 as described with reference to FIG. 10.

At 1620, the method may include descrambling the set of sign bits associated with the transport block to obtain the set of information bits. The operations of 1620 may be performed in accordance with examples as disclosed herein. In some examples, aspects of the operations of 1620 may be performed by a sign bit descrambler 1050 as described with reference to FIG. 10.

At 1625, the method may include decoding the encoded set of distributed amplitude bits to obtain a set of distributed amplitude bits associated with the codeword. The operations of 1625 may be performed in accordance with examples as disclosed herein. In some examples, aspects of the operations of 1625 may be performed by a bit decoder 1035 as described with reference to FIG. 10.

At 1630, the method may include performing a distribution matching procedure on the distributed amplitude bits to obtain a set of scrambled amplitude bits. The operations of 1630 may be performed in accordance with examples as disclosed herein. In some examples, aspects of the operations of 1630 may be performed by a distribution matcher 1040 as described with reference to FIG. 10.

At 1635, the method may include descrambling a set of scrambled amplitude bits to obtain a set of information bits associated with the transport block. The operations of 1635 may be performed in accordance with examples as disclosed herein. In some examples, aspects of the operations of 1635 may be performed by an amplitude bit descrambler 1045 as described with reference to FIG. 10.

FIG. 17 shows a flowchart illustrating a method 1700 that supports scrambling for probabilistic constellation schemes in wireless communications in accordance with aspects of the present disclosure. The operations of the method 1700 may be implemented by a base station or its components as described herein. For example, the operations of the method 1700 may be performed by a base station 105 as described with reference to FIGS. 1 through 3B and 8 through 11. In some examples, a base station may execute a set of instructions to control the functional elements of the base station to perform the described functions. Additionally or alternatively, the base station may perform aspects of the described functions using special-purpose hardware.

At 1705, the method may include receiving, from a second wireless device, a codeword associated with a transport block. The operations of 1705 may be performed in accordance with examples as disclosed herein. In some examples, aspects of the operations of 1705 may be performed by a codeword receiver 1025 as described with reference to FIG. 10.

At 1710, the method may include demodulating the codeword based on one or more constellations associated with a probabilistic constellation shaping scheme to obtain an encoded set of distributed bits associated with the transport block. The operations of 1710 may be performed in accordance with examples as disclosed herein. In some examples, aspects of the operations of 1710 may be performed by a demodulation component 1030 as described with reference to FIG. 10.

At 1715, the method may include performing a distribution matching procedure on the encoded set of distributed bits according to the probabilistic constellation shaping scheme to obtain an encoded set of information bits associated with the transport block. The operations of 1715 may be performed in accordance with examples as disclosed herein. In some examples, aspects of the operations of 1715 may be performed by a distribution matcher 1040 as described with reference to FIG. 10.

At 1720, the method may include decoding the encoded set of information bits associated with the transport block to obtain a set of information bits associated with the transport block. The operations of 1720 may be performed in accordance with examples as disclosed herein. In some examples, aspects of the operations of 1720 may be performed by a bit decoder 1035 as described with reference to FIG. 10.

The following provides an overview of aspects of the present disclosure:

Aspect 1: A method for wireless communications at a first wireless device, comprising: scrambling a set of amplitude information bits associated with a transport block for transmission to a second wireless device: performing a distribution matching procedure on the scrambled set of amplitude information bits to obtain a set of distributed amplitude bits: encoding the set of distributed amplitude bits: performing a modulation procedure on the encoded set of distributed amplitude bits in accordance with a probabilistic constellation shaping scheme to obtain a codeword associated with the transport block; and transmitting the codeword to the second wireless device.

Aspect 2: The method of aspect 1, further comprising: scrambling a set of sign bits associated with the transport block; and performing the modulation procedure on the scrambled set of sign bits, wherein the codeword comprises the scrambled set of sign bits after the modulation procedure.

Aspect 3: The method of aspect 2, wherein scrambling the set of sign bits comprises: scrambling the set of sign bits based at least in part on an index value associated with a number of the set of amplitude information bits.

Aspect 4: The method of any of aspects 2 through 3, wherein scrambling the set of sign bits comprises: scrambling the set of sign bits based at least in part on a default index value associated with the set of sign bits.

Aspect 5: The method of any of aspects 2 through 4, wherein the set of sign bits comprises one or more sign bits associated with the transport block, one or more cyclic redundancy check bits associated with a code block of the transport block, one or more parity check bits output after an encoding procedure, or a combination thereof.

Aspect 6: The method of any of aspects 1 through 5, wherein performing the modulation procedure comprises: mapping the encoded set of distributed amplitude bits to one or more symbol constellations according to the probabilistic constellation shaping scheme, wherein the codeword comprises one or more modulated symbols based at least in part on the mapping.

Aspect 7: The method of any of aspects 1 through 6, further comprising: segmenting the set of distributed amplitude bits into a plurality of code blocks; and encoding the plurality of code blocks as part of encoding the set of distributed amplitude bits.

Aspect 8: A method for wireless communications at a first wireless device, comprising: encoding a set of information bits of a transport block for transmission to a second wireless device: performing a distribution matching procedure on the encoded set of information bits according to a probabilistic constellation shaping scheme to obtain an encoded set of distributed bits: modulating the encoded set of distributed bits based at least in part on one or more constellations associated with the probabilistic constellation shaping scheme to obtain a codeword associated with the transport block; and transmitting the codeword to the second wireless device.

Aspect 9: The method of aspect 8, further comprising: scrambling the encoded set of distributed bits after the distribution matching procedure, wherein the modulating the encoded set of distributed bits comprises modulating the scrambled encoded set of distributed bits.

Aspect 10: The method of any of aspects 8 through 9, further comprising: scrambling the encoded set of distributed bits before the distribution matching procedure, wherein the distribution matching procedure is performed on the scrambled encoded set of distributed bits.

Aspect 11: A method for wireless communications at a first device, comprising: receiving, from a second wireless device, a codeword associated with a transport block: performing a modulation procedure on the codeword in accordance with a probabilistic constellation shaping scheme to obtain a codeword associated with the transport block to obtain an encoded set of distributed amplitude bits associated with the codeword: decoding the encoded set of distributed amplitude bits to obtain a set of distributed amplitude bits associated with the codeword: performing a distribution matching procedure on the distributed amplitude bits to obtain a set of scrambled amplitude bits; and descrambling a set of scrambled amplitude bits to obtain a set of information bits associated with the transport block.

Aspect 12: The method of aspect 11, further comprising: performing the modulation procedure on a scrambled set of sign bits of the codeword; and descrambling the set of sign bits associated with the transport block to obtain the set of information bits.

Aspect 13: The method of aspect 12, wherein descrambling the set of sign bits comprises: descrambling the set of sign bits based at least in part on an index value associated with a number of the set of amplitude information bits.

Aspect 14: The method of any of aspects 12 through 13, wherein descrambling the set of sign bits comprises: descrambling the set of sign bits based at least in part on a default index value associated with the set of sign bits.

Aspect 15: The method of any of aspects 12 through 14, wherein the set of sign bits comprises one or more sign bits associated with the transport block, one or more cyclic redundancy check bits associated with a code block of the transport block, one or more parity check bits output after an encoding procedure, or a combination thereof.

Aspect 16: A method for wireless communications at a first wireless device, comprising: receiving, from a second wireless device, a codeword associated with a transport block: demodulating the codeword based at least in part on one or more constellations associated with a probabilistic constellation shaping scheme to obtain an encoded set of distributed bits associated with the transport block: performing a distribution matching procedure on the encoded set of distributed bits according to the probabilistic constellation shaping scheme to obtain an encoded set of information bits associated with the transport block; and decoding the encoded set of information bits associated with the transport block to obtain a set of information bits associated with the transport block.

Aspect 17: The method of aspect 16, further comprising: descrambling the encoded set of distributed bits before the distribution matching procedure.

Aspect 18: The method of any of aspects 16 through 17, further comprising: descrambling the encoded set of information bits after the distribution matching procedure.

Aspect 19: An apparatus for wireless communications at a first wireless device, comprising a processor: memory coupled with the processor; and instructions stored in the memory and executable by the processor to cause the apparatus to perform a method of any of aspects 1 through 7.

Aspect 20: An apparatus for wireless communications at a first wireless device, comprising at least one means for performing a method of any of aspects 1 through 7.

Aspect 21: A non-transitory computer-readable medium storing code for wireless communications at a first wireless device, the code comprising instructions executable by a processor to perform a method of any of aspects 1 through 7.

Aspect 22: An apparatus for wireless communications at a first wireless device, comprising a processor: memory coupled with the processor; and instructions stored in the memory and executable by the processor to cause the apparatus to perform a method of any of aspects 8 through 10.

Aspect 23: An apparatus for wireless communications at a first wireless device, comprising at least one means for performing a method of any of aspects 8 through 10.

Aspect 24: A non-transitory computer-readable medium storing code for wireless communications at a first wireless device, the code comprising instructions executable by a processor to perform a method of any of aspects 8 through 10.

Aspect 25: An apparatus for wireless communications at a first device, comprising a processor: memory coupled with the processor; and instructions stored in the memory and executable by the processor to cause the apparatus to perform a method of any of aspects 11 through 15.

Aspect 26: An apparatus for wireless communications at a first device, comprising at least one means for performing a method of any of aspects 11 through 15.

Aspect 27: A non-transitory computer-readable medium storing code for wireless communications at a first device, the code comprising instructions executable by a processor to perform a method of any of aspects 11 through 15.

Aspect 28: An apparatus for wireless communications at a first wireless device, comprising a processor: memory coupled with the processor; and instructions stored in the memory and executable by the processor to cause the apparatus to perform a method of any of aspects 16 through 18.

Aspect 29: An apparatus for wireless communications at a first wireless device, comprising at least one means for performing a method of any of aspects 16 through 18.

Aspect 30: A non-transitory computer-readable medium storing code for wireless communications at a first wireless device, the code comprising instructions executable by a processor to perform a method of any of aspects 16 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc(DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
    scrambling a set of amplitude information bits associated with a transport block for transmission to a second wireless device;

scrambling a set of sign bits associated with the transport block based at least in part on an index value associated with a number of the set of amplitude information bits or at least in part on a default index value associated with the set of sign bits;
    performing a distribution matching procedure on the scrambled set of amplitude information bits to obtain a set of distributed amplitude bits;
    encoding the set of distributed amplitude bits;
    performing a modulation procedure on the encoded set of distributed amplitude bits and on the scrambled set of sign bits in accordance with a probabilistic constellation shaping scheme to obtain a codeword associated with the transport block; and
    transmitting the codeword to the second wireless device.

2. The method of claim 1, wherein the codeword comprises the scrambled set of sign bits after the modulation procedure.

3. The method of claim 1, wherein the set of sign bits comprises one or more sign bits associated with the transport block, one or more cyclic redundancy check bits associated with a code block of the transport block, one or more parity check bits output after an encoding procedure, or a combination thereof.

4. The method of claim 1, wherein performing the modulation procedure comprises:
    mapping the encoded set of distributed amplitude bits to one or more symbol constellations according to the probabilistic constellation shaping scheme, wherein the codeword comprises one or more modulated symbols based at least in part on the mapping.

5. The method of claim 1, further comprising:
    segmenting the set of distributed amplitude bits into a plurality of code blocks; and
    encoding the plurality of code blocks as part of encoding the set of distributed amplitude bits.

6. A method for wireless communications at a first wireless device, comprising:
    encoding a set of information bits of a transport block for transmission to a second wireless device;
    performing a distribution matching procedure on the encoded set of information bits according to a probabilistic constellation shaping scheme to obtain an encoded set of distributed bits;
    scrambling the encoded set of distributed bits after the distribution matching procedure;
    modulating the scrambled encoded set of distributed bits based at least in part on one or more constellations associated with the probabilistic constellation shaping scheme to obtain a codeword associated with the transport block; and
    transmitting the codeword to the second wireless device.

7. A method for wireless communications at a first device, comprising:
    receiving, from a second wireless device, a codeword associated with a transport block;
    performing a modulation procedure on the codeword in accordance with a probabilistic constellation shaping scheme to obtain an encoded set of distributed amplitude bits associated with the codeword;
    performing the modulation procedure on a scrambled set of sign bits of the codeword;
    decoding the encoded set of distributed amplitude bits to obtain a set of distributed amplitude bits associated with the codeword;

performing a distribution matching procedure on the set of distributed amplitude bits to obtain a set of scrambled amplitude bits; and descrambling the set of scrambled amplitude bits and the scrambled set of sign bits to obtain a set of information bits associated with the transport block, wherein the scrambled set of sign bits are descrambled based at least in part on an index value associated with a number of the set of information bits or are descrambled based at least in part on a default index value associated with the scrambled set of sign bits.

8. The method of claim 7, wherein the scrambled set of sign bits comprises one or more sign bits associated with the transport block, one or more cyclic redundancy check bits associated with a code block of the transport block, one or more parity check bits output after an encoding procedure, or a combination thereof.

9. A method for wireless communications at a first wireless device, comprising:

receiving, from a second wireless device, a codeword associated with a transport block;

demodulating the codeword based at least in part on one or more constellations associated with a probabilistic constellation shaping scheme to obtain an encoded set of distributed bits associated with the transport block;

performing a distribution matching procedure on the encoded set of distributed bits according to the probabilistic constellation shaping scheme to obtain an encoded set of information bits associated with the transport block;

descrambling the encoded set of information bits after the distribution matching procedure; and decoding the encoded set of information bits associated with the transport block to obtain a set of information bits associated with the transport block.

10. An apparatus for wireless communications at a first wireless device, comprising:

a processor;

memory coupled with the processor; and instructions stored in the memory and executable by the processor to cause the apparatus to:

scramble a set of amplitude information bits associated with a transport block for transmission to a second wireless device;

scramble a set of sign bits associated with the transport block based at least in part on an index value associated with a number of the set of amplitude information bits or at least in part on a default index value associated with the set of sign bits;

perform a distribution matching procedure on the scrambled set of amplitude information bits to obtain a set of distributed amplitude bits;

encode the set of distributed amplitude bits;

perform a modulation procedure on the encoded set of distributed amplitude bits and on the scrambled set of sign bits in accordance with a probabilistic constellation shaping scheme to obtain a codeword associated with the transport block; and transmit the codeword to the second wireless device.

* * * * *